United States Patent
Zhao et al.

(10) Patent No.: US 9,608,758 B1
(45) Date of Patent: Mar. 28, 2017

(54) LOW COST GAIN CLAMPED EDFA FOR TWDM PASSIVE OPTICAL NETWORK APPLICATION

(71) Applicant: Google Inc., Mountain View, CA (US)

(72) Inventors: Xiangjun Zhao, Fremont, CA (US);
Chiachi Wang, Union City, CA (US);
Daoyi Wang, San Jose, CA (US);
Cedric Fung Lam, Belmont, CA (US);
Liang Du, Santa Clara, CA (US);
Changhong Joy Jiang, Dublin, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/953,525

(22) Filed: Nov. 30, 2015

(51) Int. Cl.
*H04B 10/00* (2013.01)
*H04J 14/02* (2006.01)

(52) U.S. Cl.
CPC ...... *H04J 14/0223* (2013.01); *H04J 14/0205* (2013.01); *H04J 14/0221* (2013.01); *H04J 14/0282* (2013.01)

(58) Field of Classification Search
USPC .................................................. 398/173–181
See application file for complete search history.

(56) References Cited

U.S. PATENT DOCUMENTS

| | | | | |
|---|---|---|---|---|
| 7,440,169 B2 * | 10/2008 | Pfeiffer | ............... | H01S 3/06754 359/337.13 |
| 7,876,498 B1 * | 1/2011 | Honea | ................. | H01S 3/06758 359/341.41 |
| 8,363,312 B1 * | 1/2013 | Honea | ................. | H01S 3/06758 359/341.41 |
| 2004/0264977 A1 * | 12/2004 | Yap | ........................... | G02F 2/02 398/161 |
| 2008/0137179 A1 * | 6/2008 | Li | ...................... | H01S 3/06754 359/337.13 |
| 2009/0202196 A1 * | 8/2009 | Kish, Jr. | ............... | B82Y 20/00 385/14 |
| 2010/0091355 A1 * | 4/2010 | Ota | ...................... | H04B 10/291 359/337 |

(Continued)

FOREIGN PATENT DOCUMENTS

| | | |
|---|---|---|
| EP | 1976158 A1 | 10/2008 |
| WO | WO-2014096441 A1 | 6/2014 |

*Primary Examiner* — Agustin Bello
(74) *Attorney, Agent, or Firm* — Honigman Miller Schwartz and Cohn LLP

(57) ABSTRACT

A communication system includes a first optical system and a second optical system optically connected to a clamping laser and a pump laser. The first optical system includes first and second optical splitters. The first optical splitter is configured to receive a clamping laser signal from the clamping laser and split the signal into split clamping laser signals. The second optical splitter is configured to receive a pump laser signal from the pump laser and split signal into split pump laser signals. The second optical system is optically connected to the first optical system and includes amplifier systems. Each amplifier system is configured to receive a multiplexed signal. The second optical system includes first and second combiners optically connected to an erbium-doped fiber. The first combiner is optically connected to the first splitter, and the second combiner is optically connected to the second splitter.

30 Claims, 11 Drawing Sheets

(56) References Cited

U.S. PATENT DOCUMENTS

| | | | |
|---|---|---|---|
| 2011/0044688 A1* | 2/2011 | Lee .................... | H04B 10/2916 |
| | | | 398/58 |
| 2013/0004181 A1* | 1/2013 | Juarez ................ | H04B 10/1121 |
| | | | 398/118 |
| 2014/0161446 A1* | 6/2014 | Lee .................... | H04J 14/0221 |
| | | | 398/34 |

* cited by examiner

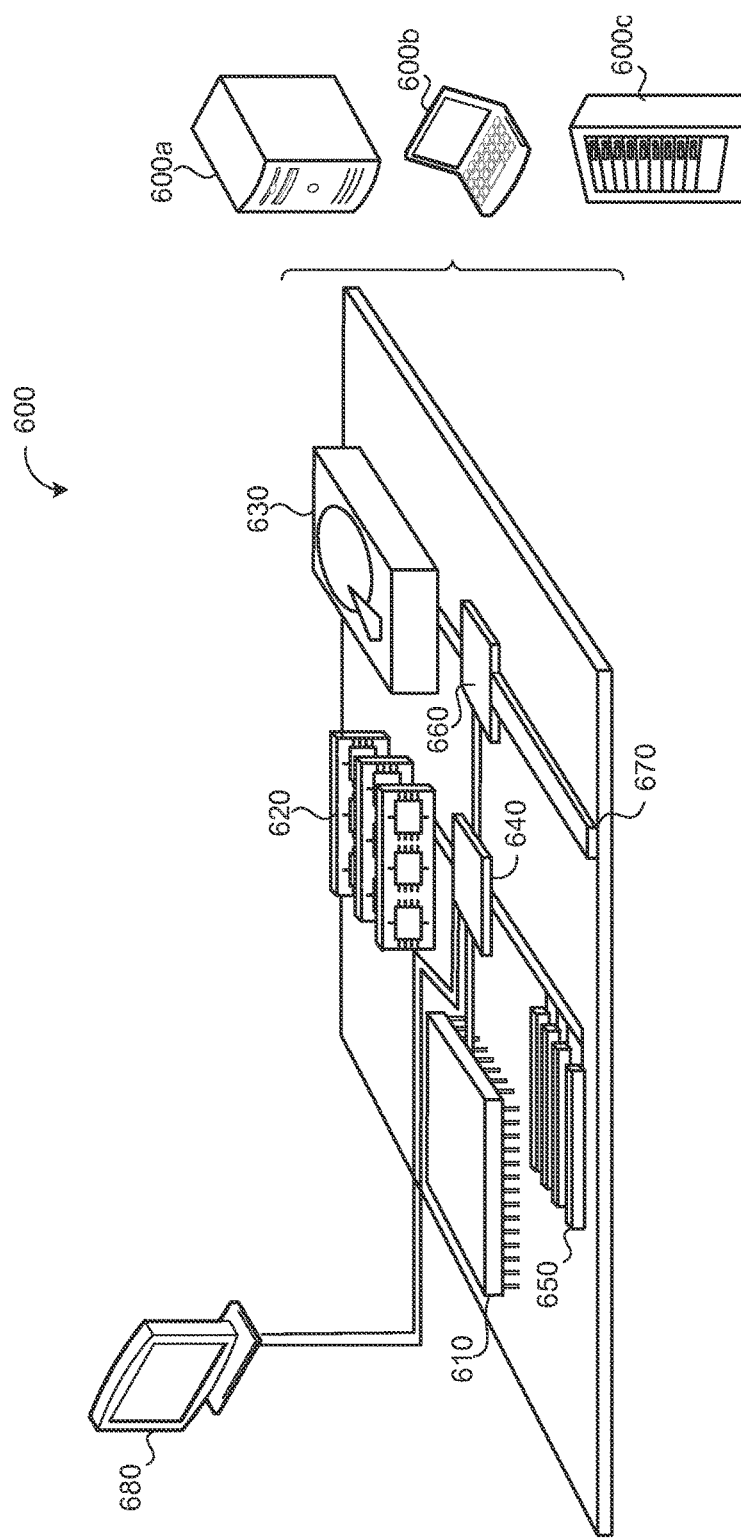

LOW COST GAIN CLAMPED EDFA FOR TWDM PASSIVE OPTICAL NETWORK APPLICATION

TECHNICAL FIELD

This disclosure relates to Time-Wavelength-Division-Multiplexing Passive Optical Network (TWDM-PON) architecture having a low cost gain clamped Erbium-Doped Fiber amplifier (EDFA).

BACKGROUND

A basic communication system includes a transmitter that converts a message to an electrical form suitable to be transferred over a communication channel. The communication channel transfers the message from the transmitter to the receiver. The receiver receives the message and converts it back to its original form.

Fiber optic communication is an emerging method of transmitting information from a source (transmitter) to a destination (receiver) using optical fibers as the communication channel. Optical fibers are flexible, transparent media made of thin glass silica or plastic that transmits light throughout the length of the fiber between the source and the destination. Fiber optic communications allow for the transmission of data over longer distances and at higher bandwidth than other known forms of communications. Fiber optics are an improved form of communication over metal wires because the light traveled through the fiber experiences less loss and is immune to electromagnetic interference. Companies use optical fibers to transmit telephone signals, internet communication, and cable television signals. A fiber-to-the-home (FTTH) network or fiber access network connects the end users using optical fiber as the last mile connection from the service provider.

Fiber-optic communication provides a very low loss of signal and very high-bandwidth. These two properties allow service providers to directly connect to end-users from their central office (CO) using a passive fiber plant, which produces capital and operational cost savings. As demand for bandwidth in today's Internet continues to increase, Fiber-to-the-home (FTTH) networks have become a good future proof technology for carriers to wire and rewire customers.

SUMMARY

One aspect of the disclosure provides a communication system that includes a first optical system and a second optical system. The first optical system is optically connected to a clamping laser and a pump laser. In addition, the first optical system includes first and second optical splitters. The first optical splitter is configured to receive a clamping laser signal from the clamping laser and split the received clamping laser signal into split clamping laser signals. The second optical splitter is configured to receive a pump laser signal from the pump laser and split the received pump laser signal into split pump laser signals. The second optical system is optically connected to the first optical system. Moreover, the second optical system includes amplifier systems, where each amplifier system is configured to receive a multiplexed signal. Each amplifier system includes first and second combiners optically connected to an erbium-doped fiber. The first combiner is optically connected to the first splitter, and the second combiner is optically connected to the second splitter. The first combiner is configured to receive the multiplexed signal and one of the split clamping laser signals and combine the multiplexed signal and the one of the split clamping laser signals into a first combined signal. Furthermore, the second combiner is configured to receive the first combined signal and one of the split pump laser signals, and combine the first combined signal and the one of the split pump laser signals into a second combined signal. The erbium-doped fiber is configured to receive the second combined signal, and amplify the multiplexed signal and the split clamping laser signal of the second combined signal. In addition, the erbium-doped fiber is configured to attenuate the split pump laser signal of the second combined signal, and output an amplified output signal from the second optical system to a demultiplexer optically connected to the second optical system. The amplified output signal includes the amplified multiplexed signal, the amplified split clamping laser signal and the attenuated split pump laser signal. In other words, inside the erbium-doped fiber, the energy of the pump is given to the multiplexed signal and clamping signal (first combined signal). This amplifies the first combined signal while reducing the power of the pump signal. In some implementations, a cleaning filter may be optically connected to an output end of the erbium-doped fiber. The cleaning filter receives the amplified output signal after it is outputted from the erbium-doped fiber, and removes any residual pump and clamping signal from the amplified output signal and outputs a filtered amplified output signal into the demultiplexer optically connected with the output of the amplifier system.

Implementations of the disclosure may include one or more of the following optional features. In some implementations, each amplifier system is configured to maintain a constant pump power or a constant current. The communication system may further include a controller in communication with the pump laser and the clamping laser. The controller is configured to control a total pump power output and a total clamping laser output. In some examples, the communication system further includes the demultiplexer, which is configured to receive the amplified output signal, demultiplex the amplified output signal into demultiplexed optical signals, and output each demultiplexed optical signal to an optical line terminal in optical communication with the demultiplexer. The multiplexed signal may include upstream signals, where each upstream signal is received from an optical network unit.

Another aspect of the disclosure provides a method that includes receiving, at a first optical splitter of a first optical system optically connected to a clamping laser, a clamping laser signal. The method includes receiving, at a second optical splitter of the first optical system optically connected to a pump laser, a pump laser signal. The method includes: splitting, at the first optical splitter, the received clamping laser signal into split clamping laser signals; and splitting, at the second optical splitter, the received pump laser signal into split pump laser signals. Additionally, the method includes receiving, at a second optical system having amplifier systems, the split clamping laser signals and the split pump laser signals. One of the split clamping laser signals and one of the split pump laser signals is received at each amplifier system. Each amplifier system has first and second combiners, and an erbium-doped fiber. The method also includes receiving, at each amplifier system, a multiplexed signal. The method includes combining, at the first combiner of each amplifier system, the multiplexed signal and the received split clamping signal into a first combined signal and combining, at the second combiner of each amplifier system, the first combined signal and the split pump laser signal into a second combined signal. The method includes amplifying, at an erbium-doped fiber optically connected to an output of the second combiner, the multiplexed signal and the split clamping signal of the second combined signal. The method includes, attenuating at the erbium-doped fiber, the split pump laser signal of the second combined signal, and outputting, from each amplifier system to a demultiplexer optically connected to the amplifier system, an amplified output signal. The amplified output signal including the amplified multiplexed signal, the amplified split clamping laser signal and the attenuated split pump laser signal. In some implementations, a cleaning filter may be optically connected to an output end of the erbium-doped fiber. The cleaning filter receives the amplified output signal after it is outputted from the erbium-doped fiber, and removes any residual pump and clamping signal from the amplified output signal and outputs a filtered amplified output signal into the demultiplexer optically connected with the output of the amplifier system.

This aspect may include one or more of the following optional features. In some implementations, each amplifier system is configured to maintain a constant pump power or a constant current. The method may further include controlling, using a controller in communication with the pump laser and the clamping laser to control a total pump power output and a total clamping laser output. In some examples, the method includes: receiving, at the demultiplexer, the amplified output signal; demultiplexing, at the demultiplexer, the amplified output signal into demultiplexed optical signals; and outputting, from the demultiplexer, each demultiplexed optical signal to an optical line terminal in optical communication with the demultiplexer. The multiplexed signals may include upstream signals, where each upstream signal is received from an optical network unit.

Another aspect of the disclosure provides a communication system that includes a first optical system and a second optical system. The first optical system is optically connected to a pump laser and a clamping laser. The first optical system includes a first combiner and a splitter. The first combiner is configured to receive a pump laser signal from the pump laser and a clamping laser signal from the clamping laser. The first combiner is configured to combine the received pump laser signal and the received clamping laser signal into a first combined signal. The splitter is configured to split the first combined signal into split signals. The second optical system is optically connected to the first optical system. The second optical system includes amplifier systems. Each amplifier system is configured to receive a multiplexed signal. In addition, each amplifier system includes a second combiner and an erbium-doped fiber having an input end and an output end. The second combiner is optically connected to the input end of the erbium-doped fiber. More specifically, the second combiner is between the first combiner and the erbium-doped fiber. The second combiner is configured to receive the multiplexed signal and one of the split signals, and combine the multiplexed signal and the one of the split signals into a second combined signal. The erbium-doped fiber is configured to receive the second combined signal, and output the second combined signal as an amplified output signal from the output end of the erbium-doped fiber, to a demultiplexer optically connected to the second optical system with the output end of the erbium-doped fiber. In some implementations, a cleaning filter may be optically connected to the output end of the erbium-doped fiber. The cleaning filter receives the amplified output signal after it is outputted from the erbium-doped fiber, and removes any residual pump and clamping signal from the amplified output signal and outputs a filtered amplified output signal into the demultiplexer optically connected with the output of the amplifier system.

This aspect may include one or more of the following optional features. In some implementations, each amplifier system is configured to maintain a constant pump power or a constant current. The communication system may include a controller in communication with the pump laser and the clamping laser. The controller is configured to control a total pump power output and a total clamping laser output. In some examples, the communication system further includes the demultiplexer. The demultiplexer is configured to: receive the amplified output signal; demultiplex the amplified output signal into demultiplexed optical signals; and output each demultiplexed optical signal to an optical line terminal in optical communication with the demultiplexer. The multiplexed signal may include upstream signals, where each upstream signal is received from an optical network unit.

Yet another aspect of the disclosure provides a method that includes receiving, at a first optical combiner, a clamping laser signal from a clamping laser and a pump laser signal from a pump laser. The method includes combining, at the first optical combiner, the clamping laser signal and the pump laser signal into a first combined signal and receiving, at a splitter optically connected to the first combiner, the first combined signal. The method also includes splitting, at the splitter, the first combined signal into split signals and receiving, at a second optical system having amplifier systems, the split signals. Each amplifier system receives one of the split signals. The method further includes receiving, at each amplifier system, a multiplexed signal. The method includes combining, at a combiner of each amplifier system, the multiplexed signal and the received split signal into a second combined signal. The method also includes receiving, at an erbium-doped fiber of each amplifier system, the second combined signal. The method also includes outputting from the erbium-doped fiber of each amplifier system to a demultiplexer optically connected to the amplifier system, the second combined signal as an amplified output signal. In some implementations, a cleaning filter may be optically connected to an output end of the erbium-doped fiber. The cleaning filter receives the amplified output signal after it is outputted from the erbium-doped fiber, and removes any residual pump and clamping signal from the amplified output signal and outputs a filtered amplified output signal into the demultiplexer optically connected with an output of the amplifier system.

This aspect may include one or more of the following optional features. In some implementations each amplifier system is configured to maintain a constant pump power or a constant current. The method may further include controlling, using a controller in communication with the pump laser and the clamping laser, a total pump power output and a total clamping laser output. In some examples, the method further includes receiving, at the demultiplexer, the amplified output signal, demultiplexing, at the demultiplexer, the amplified output signal into demultiplexed optical signals, and outputting, from the demultiplexer, each demultiplexed optical signal to an optical line terminal in optical communication with the demultiplexer. The multiplexed signal may include upstream signals, where each upstream signal is received from an optical network unit.

Yet another aspect of the disclosure provides a communication system that includes a first optical system and a second optical system optically connected to the first optical system. The first optical system is optically connected to a clamping laser and a pump laser. The first optical system includes first and second optical splitters. The first optical splitter is configured to receive a clamping laser signal from the clamping laser and split the received clamping laser signal into split clamping laser signals. The second optical splitter is configured to receive a pump laser signal from the pump laser and split the received pump laser signal into split pump laser signals. In addition, the second optical system includes amplifier systems. Each amplifier system includes first and second combiners, and an erbium-doped fiber. The erbium-doped fiber has an input end optically connected to the first combiner and an output end optically connected to the second combiner. The first combiner is optically connected to the first splitter, and the second combiner is optically connected to the second splitter. The first combiner is configured to receive a multiplexed signal and one of the split clamping laser signals, and combine the multiplexed signal and the one of the split clamping laser signals into a first combined signal. The second combiner is connected to the output of the erbium-doped fiber. The second combiner is configured to receive the amplified first combined signal and one of the split pump laser signals. In addition, the second combiner is configured to combine the amplified first combined signal and the one of the split pump laser signals into an intermediate amplified signal in a counter-propagating manor. This allows the split pump laser signal to travel in an opposite direction in the erbium-doped fiber with respect to the first combined signal to allow the amplification of the first combined signal by the erbium-doped fiber. The second combiner is also configured to output an amplified output signal (i.e., the amplified first combined signal) from the second optical system. In some examples, a cleaning filter may be present at the output of the second combiner to remove the clamping signal. Additionally or alternatively, in some examples a different cleaning filter may be present at the output of the erbium-doped fiber to remove any residual pump signal from the intermediate amplified signal.

This aspect may include one or more of the following optional features. In some implementations, each amplifier system is configured to maintain a constant pump power or a constant current. The communication system may include a controller in communication with the pump laser and the clamping laser. The controller is configured to control a total pump power output and a total clamping laser output. In some examples, the communication system further includes the demultiplexer. The demultiplexer is configured to: receive the amplified output signal; demultiplex the amplified output signal into demultiplexed optical signals; and output each demultiplexed optical signal, for example, to an optical line terminal in optical communication with the demultiplexer. The multiplexed signal may include upstream signals, where each upstream signal is received from an optical network unit.

Another aspect of the disclosure provides a method that includes receiving, at a first optical splitter of a first optical system optically connected to a clamping laser, a clamping laser signal. The method includes receiving a pump laser signal, at a second optical splitter of the first optical system optically connected to a pump laser. The method includes splitting, at the first optical splitter, the received clamping laser signal into split clamping laser signals. The method includes splitting, at the second optical splitter, the received pump laser signal into split pump laser signals. Additionally, the method includes receiving, at the second optical system having amplifier systems 200, the split clamping laser signals and the split pump laser signals. Each amplifier system receives one of the split clamping laser signals and one of the split pump laser signals. Each amplifier system has first and second combiners and an erbium-doped fiber. The method also includes receiving, at each amplifier system, an upstream multiplexed signal. The method includes combining, at the first combiner of each amplifier system, the upstream multiplexed signal and the received split clamping signal into a first combined signal. The method includes amplifying, at the erbium-doped fiber that is optically connected to an output of the first combiner and an output of the second combiner, the first combined signal into an amplified first combined signal. The method also includes combining, at the second combiner of each amplifier system, the amplified first combined signal and the one of the split pump laser signals into an intermediate amplified signal in a counter-propagating manor. This allows the split pump laser signal to travel in an opposite direction in the erbium-doped fiber with respect to the first combined signal to allow the amplification of the first combined signal by the erbium-doped fiber. The method also includes attenuating, at the erbium-doped fiber of each amplifier system, the split laser signal of the intermediate amplified signal. The method also includes outputting, from each amplifier system, for example, to a demultiplexer optically connected to the amplifier system, an amplified output signal that includes the amplified first combined signal. In some examples, a cleaning filter may be present at the output of the second combiner to remove the clamping signal and any residual pump signal. Additionally or alternatively, in some examples a different cleaning filter may be present at the output of the erbium-doped fiber to remove any residual pump signal from the intermediate amplified signal.

This aspect may include one or more of the following optional features. In some implementations each amplifier system is configured to maintain a constant pump power or a constant current. The method may further include controlling, using a controller in communication with the pump laser and the clamping laser, a total pump power output and a total clamping laser output. In some examples, the method further includes receiving, at the demultiplexer, the amplified output signal, demultiplexing, at the demultiplexer, the amplified output signal into demultiplexed optical signals, and outputting, from the demultiplexer, each demultiplexed optical signal to an optical line terminal in optical communication with the demultiplexer. The multiplexed signal may include upstream signals, where each upstream signal is received from an optical network unit.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a schematic view of an example computing device executing any systems or methods described herein.

Like reference symbols in the various drawings indicate like elements.

DETAILED DESCRIPTION

Fiber to the home (FTTH) is regarded as the end state of broadband access networks as fiber offers virtually unlimited bandwidth. FTTH replaces currently used copper infrastructure (e.g., telephone wires, coaxial cable, etc.). FTTH is the delivery of a communication signal through optical fibers from a central office (CO) or optical line terminal (OLT) to a home or a business of a user. Today's FTTH systems are mostly offered through point-to-multi-point time division multiplexed (TDM) passive optical networks (PONs) using a passive optical power splitter at a remote node 70 (RN) (see FIG. 1A) in the field to share a common transceiver 50 (OLT) at the CO 40, or through point-to-point (pt-2-pt) direct connection, where a home-run fiber extends all the way back to the CO 40 and each customer is terminated by a separate transceiver (as opposed to the shared transceiver used by TDM-PONs). Multiplexing is a method used in optical networks to utilize the large bandwidth of optics to their full benefits. Multiplexing enables several virtual channels to be formed on a single fiber. Therefore, multiplexing several optical signals increases the utility of a network infrastructure. Time-Division-multiplexing (TDM) is a method used to multiplex several signals onto one high-speed digital signal on a fiber optic link. TDM multiplexes several signals by establishing different virtual channels using different time slots. Wavelength-Division-Multiplexing (WDM) is another method used to multiplex the signals by having different channels use different wavelengths; these channels are generated by separate lasers and their traffic typically does not interact.

Figure 1A:
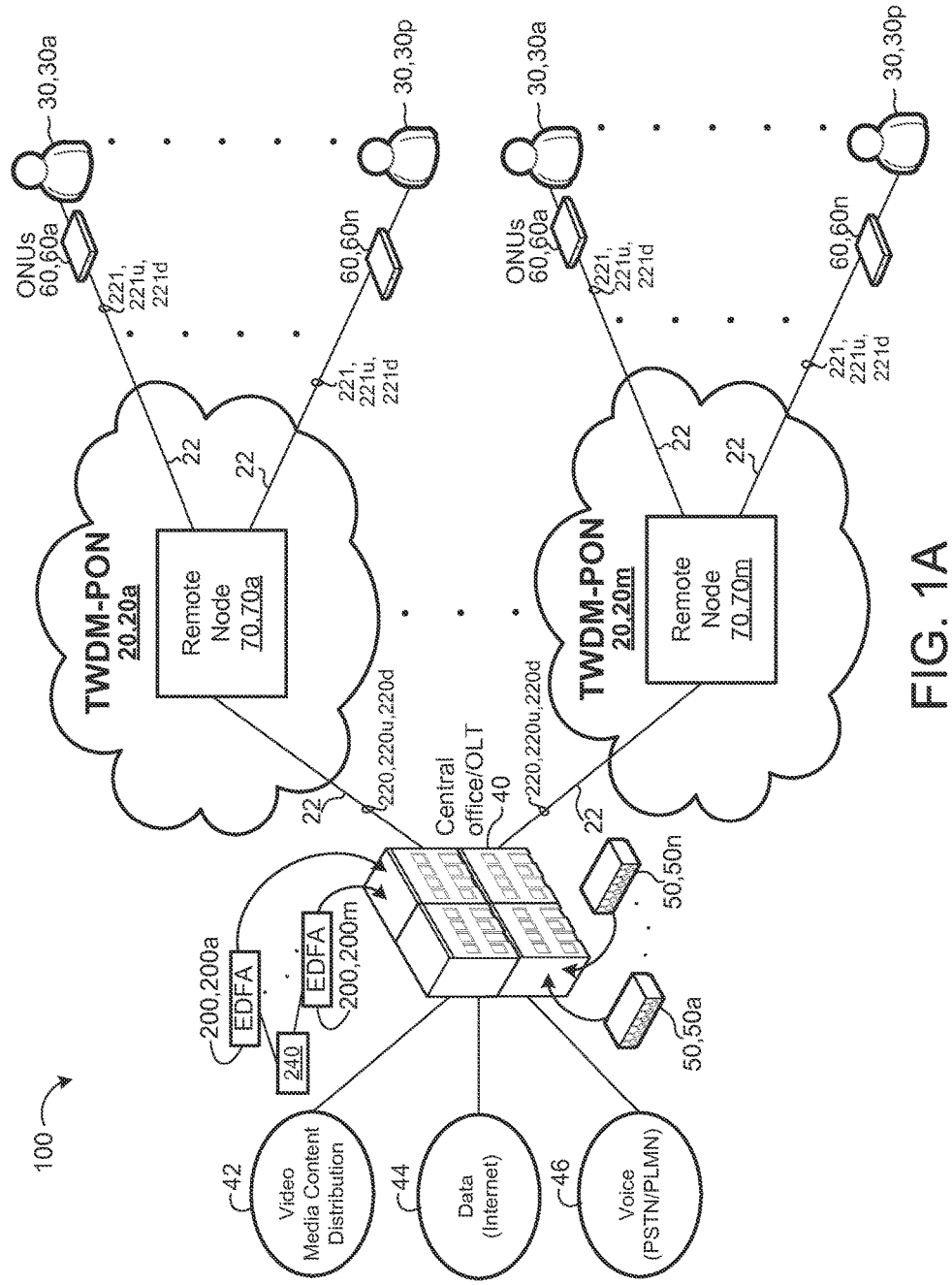
FIG. 1A is a schematic view of an example TWDM-PON architecture.

In recent years, aspects of TDM architectures and WDM architectures are combined into a TWDM (Time-Wavelength-Division-Multiplexing) architecture 100 as shown in FIG. 1A. A communication system 100 including TWDM-PON architecture 20 includes a CO 40 servicing one or more TWDM-PONs 20, 20a-20m. Each TWDM-PON 20 allows for the transmission of optical signals 220 (e.g., downstream optical signals 220d) from the CO 40 that includes an optical transmitter/receiver or transceiver 50 to a number of optical network terminals (ONUs) 60 on customer premises. In turn, each ONU 60, 60a-60n includes a bidirectional optical transceiver, and sends upstream optical signal 220u to the OLT 220u.

Compared to pt-2-pt home run systems, TDM-PONs provide beneficial savings in the number of feeder fibers 22 (between a remote node (RN) 70 and the CO 40), and in the number of optical transceivers 50 at the CO 40 while saving patch panel space to terminate fibers. However, multiple users 30 share the total bandwidth of the OLT transceiver 50. Pt-2-pt systems provide high bandwidth to end users 30, 30a-30p; however, pt-2-pt uses a great number of both trunk fibers 22 and optical transceivers 50. Thus, pt-2-pt systems do not scale well in dense areas because of the large number of OLTs 50 at the CO 40 and the fiber count between the CO 40 and the RN 70, resulting in greater space requirements, higher power, and an increased cost. TWDM-PON architectures 20, such as NG-PON2, combine the benefits of both TDM and the use of multiple wavelength channels to scale the total bandwidth to each user 30.

With continued reference to the communication system of 100 of FIG. 1A, the CO 40 receives information, such as video media distribution 42, internet data 44, and voice data 46 that may be transferred to the end users 30. The CO 40 includes optical line terminals (OLTs) 50 connecting the optical access network to an IP, ATM, or SONET backbone, for example. Therefore, the OLTs 50 are the endpoints of the communication system 100. Each OLT 50 converts electrical signals used by a service provider's equipment and the fiber optic signals used by the PONs 20. In addition, each OLT 50 coordinates multiplexing between the conversion devices at the user end 30. Each OLT 50 sends the downstream fiber optic signal 220d through a feeder fiber 22 and received the upstream fiber optic signal 220u through the feeder fiber 22. As shown, the CO 40 services multiple TWDM-PONs 20a-20m. The CO 40 may include multiple chassis (not shown), where each chassis houses and supports multiple OLTs 50, 50aa-50an, 50na-50nn each OLT 50 using a different wavelength from the other OLTs 50. In some examples, each OLT 50 within each group of OLTs 50 or OLTs 50 supported by one chassis sends a signal that is multiplexed with the other signals of the OLTs 50 within the same group or supported by the same chassis. In such a case, each OLT 50 within the group of OLTs 50 or the OLTs 50 supported by the same chassis uses different wavelengths.

A multiplexer (MUX) combines several input signals and outputs a combined signal of the separate signals. The multiplexed signal is transmitted through a physical wire, e.g., single optical fiber feeder 22, which saves the cost of having multiple wires for each signal. As shown in FIG. 1A, the CO 40 multiplexes the signals received from several sources, such as video media distribution 42, internet data 44, and voice data 46, and multiplexes the received signals into one multiplexed signal before sending the multiplexed signal to the remote node 70 through the feeder fiber 22. In addition, the CO 40 multiplexes the signals of multiple OLTs 50 before sending the multiplexed signal to the RN 70 set through the feeder fiber 22. On the receiver end, i.e., the ONU 60 at the user end, a reverse process occurs using a demultiplexer. The demultiplexer receives the multiplexed signal and divides it into the separate original signals that were originally combined. In some examples, a photodetector converts the optical wave back into its electric form and is located at the remote node or at the end user 30 (e.g., data over a network, sound waves converted into currents using microphones and back to its original physical form using speakers, converting images converted into currents using video cameras and converting back to its physical form using a television).

A transceiver or ONU 60, on the user end, includes a carrier source (e.g., laser diode or light-emitting diode) for generating an optical signal that carries the information to be sent from an end user 30 to the CO 40. A laser is a high-frequency generator or oscillator, which requires amplification, feedback, and a tuning mechanism that determines the frequency. Lasers emit light coherently such that the laser output is a narrow beam of light. In some implementations, a laser includes a medium that provides the amplification and the frequency, and mirrors that provide the feedback. Photons bounce off one mirror through the medium and head back to another mirror to bounce back for further amplification. One, and sometimes both mirrors, may partially transmit light to allow a fraction of the generated light to be emitted. A laser diode is an electrically pumped semiconductor laser having an active medium being a p-n junction. The p-n junction is created by doping (i.e., introduction of impurities into a pure semiconductor to change its electrical properties). As shown, one feeder fiber 22 is employed from the CO 40 to the RN 70, where the signal is split/demultiplexed and distributed to, for example, multiple ONUs 60a-60n. As shown, the system 100 includes one RN 70 for each TWDM-PON 20, but in other examples, the system 100 may include more than one RN 70 associated with each TWDM-PON 20. Each RN 70 splits/demultiplexes a received downstream signal 220d and combines/multiplexes received signals from multiple ONUs 60a-60n into an upstream signal 220u.

Figure 1B:
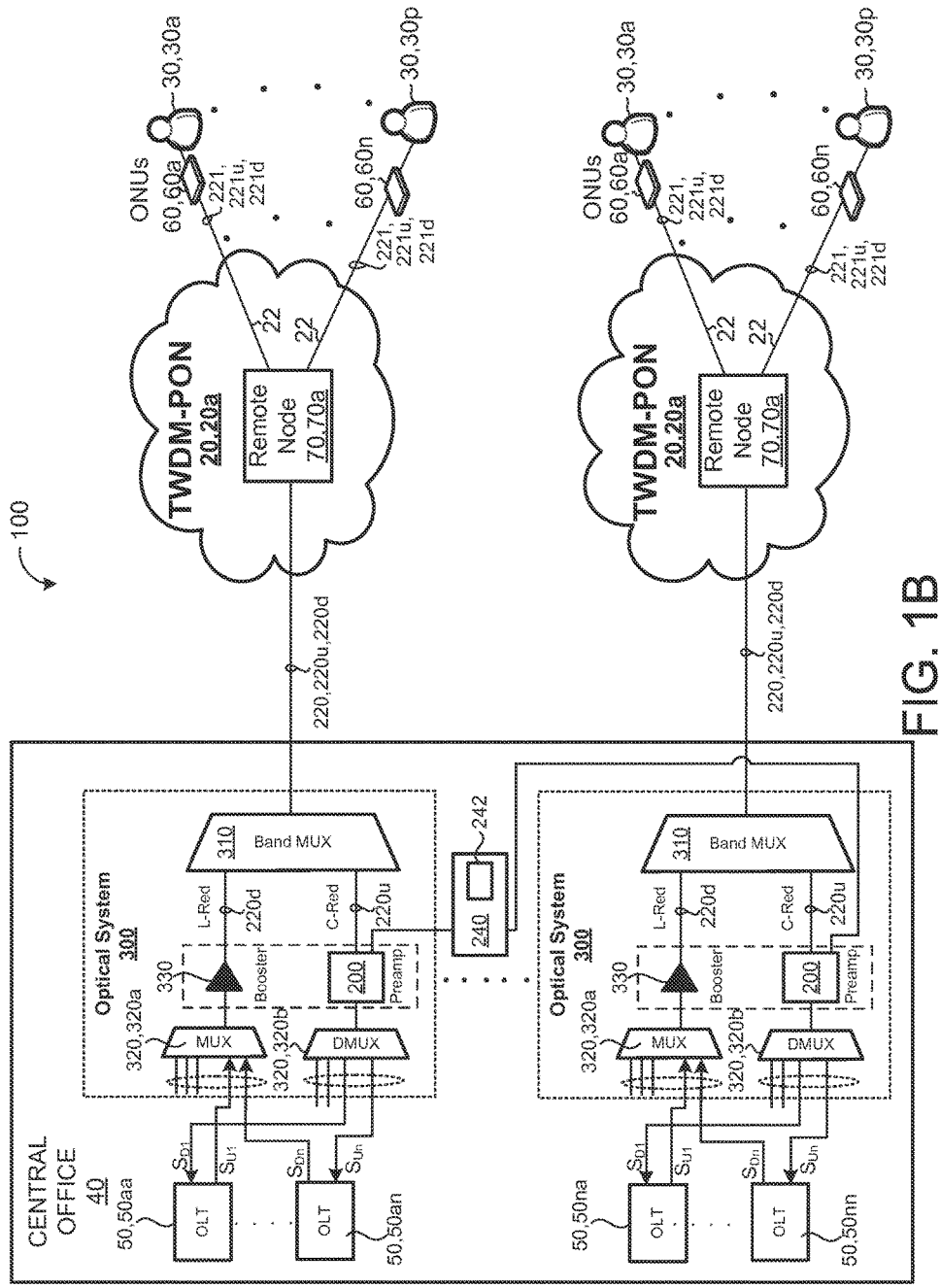
FIG. 1B is a schematic view of an example TWDM-PON architecture.

Referring to FIGS. 1A and 1B, the CO 40 multiplexes downstream signals 220d, i.e., signals 220d from the CO 40 to the user 30, and sends the downstream signals 220d to the ONUs 60. Each group of OLTs 50, where each OLT 50 within the group operates at a different wavelength from the other OLTs 50 within the group, form a TWDM-PON 20. The TWDM-PON 20 provides bidirectional communication signals 220 between the CO 40 and the ONUs 60. More specifically, the TWDM-PON 20 includes downstream signals 220d (from the CO 40 to the ONUs 60) and upstream signals 220u (from the ONUs 60 to the CO 40).

In some examples, the downstream signal 220d from the CO 40 to the ONU 60 is first received by the passive RN 70 before reaching the ONU 60. The RN 70 receives the downstream signal 220d, then demultiplexes or splits the downstream signal 220u before sending the split/demultiplexed downstream signal 221, 221d to the ONUs 60, thus distributing the signal 221d to multiple users 30. In some examples, each CO 40 includes multiple OLTs 50, 50a-n. Each OLT 50 is configured to provide a signal to a group of users 30. In addition, each OLT 50 may be configured to provide signals or services that are in a different transmission protocols, e.g., one OLT 50 provides services in 1G-PON and another provides services in 10G-PON. When the CO 40 includes more than one OLT 50, the signal (i.e., the upstream and downstream signal) of each OLT 50 is multiplexed with the signals of the other OLTs 50 (e.g., optical system 300 that includes multiplexer 310, 320 as shown in FIG. 1B of the communication system 100) before sending it to the remote node 70. Similarly, the ONUs 60 send an upstream signal 220u to the OLTs 50. The RN 70 receives upstream signals 221u from multiple ONUs 60, and multiplexes the received upstream signals 221u into a multiplexed upstream signal 220u before sending the multiplexed upstream signal 220u to the CO 40.

As shown in FIG. 1B, the CO 40 includes multiple OLT optical systems 300, a laser system 240 (including a first optical system 242) connected with the multiple OLT optical systems 300, and OLTs 50 or an array or groupings of OLTS 50, 50aa-50an, 50na-50nn optically connected to the OLT optical systems 300. The OLT optical system 300 includes duplex fibers for separate transmitting (downstream signals 220d) and receiving connections (upstream signals 220u), which is different than the conventional G-PON OLT transceivers having a single fiber interface with a built in diplexer that separates upstream and downstream signals within the OLT 50. The OLT optical system 300 includes a band multiplexer 310, a downstream multiplexer 320a for multiplexing downstream signals 220d from the OLT 50 (in L-Red band), and an upstream demultiplexer 320b for demultiplexing upstream signals 220u received from the ONUs 60 (in C-Red band). The band multiplexer 310 acts as a diplexer since it multiplexes the upstream OLT signals 220u (in C-red band) and the downstream OLT signals 220d (in L-Red band) into one transmit signal 220. The design of the OLT optical system 300 uses a downstream multiplexer 320a to multiplex downstream signals $S_{D1}$-$S_{Dn}$ from one or more or OLTs 50 into one downstream signal 220d, and an upstream demultiplexer 320b for demultiplexing a multiplexed upstream signal 220u to one or more upstream signals $S_{U1}$-$S_{Un}$ to each OLT 50.

The OLT optical system 300 may include a signal booster 330 and/or an amplifier system 200 in the downstream and upstream directions respectively. The signal booster 330 and/or the amplifier system 200 (FIGS. 2C-2E) may include an Erbium-Doped Fiber (EDF). An EDFA is an optical repeater device that is used to boost the intensity of optical signals carried through feeder fiber 22. The EDFA signal booster 330 is optically connected to the downstream multiplexer 320a and the band multiplexer 310 and boosts the power of the multiplexed downstream signal 220d with a higher-power EDFA before entering into the long fiber feeder 22, or a device with large losses (e.g., power splitter) so it reaches the ONU 60. The amplifier system 200 is optically connected with the upstream demultiplexer 320b and the band multiplexer 310 and boosts the power of the multiplexed upstream signal 220u. The amplifier system 200 is positioned so that the multiplexed upstream signal 220u is amplified when it arrives at the optical system 300 as a weak signal. In some examples, the amplifier systems 200 or array of amplifier systems (also referred to as a second optical device 270) collectively use the laser system 240 to amplifying the upstream signal 220u, the cost of the laser system 240 is shared amongst the OLTs 50.

TWDM-PONs 20 use multiple wavelengths in one fiber feeder 22 to increase the capacity of the PON 20. Increasing the length of each fiber feeder 22 allows users 30 located far from the CO 40 to receive/transmit signals from/to the CO 40, thus be served by the TWDM-PONs 20. Service providers who provide communication services between the CO 40 and the ONUs 60 want to increase the splitting ratio at the RN 70 (e.g., increase the splitting ratio of splitters located at the RN 70) or extend the feeder fibers 22 (e.g., from the CO 40 to the RN 70, or from the RN 70 to the ONUs 60) to serve more users 30. However, increasing the splitting ratio of the splitters at the RN 70 and/or increasing the length of the fiber feeder 22 increases the passive signal loss in the TWDM-PON 20. An increase in the passive signal loss adds a stress on the optical transmitters and optical receivers used at the OLTs 50 and ONUs 60 either technically or economically. To mitigate this problem, the service providers may increase the output power of the transmitters, improve the sensitivity of the receivers, or deploy amplifiers at the RN(s) 70 or CO 40. In a TWDM-PON 20 system, an added optical amplifier at the RN(s) 70 or CO 40 may be shared by multiple wavelengths, allowing the TWDM-PON 20 system to be more cost effective in comparison to increasing the power of the transmitters by using high-power lasers or increasing the sensitivity of the receivers by using high-sensitivity photodetectors. Therefore, it is desirable to use optical amplifier systems 200 that are deployed at the OLT 50 (CO 40) to compensate for the optical loss of the upstream 220u signals in the TWDM-PON 20, and use signal boosters 330 to compensate for the optical loss of downstream signals. In some examples, the upstream signal 220u is weakened due to the distance the signal travels from the ONU 60 until it reaches the CO 40. Therefore, it is desirable to include the amplifier systems 200 associated with each TWDM-PON 20 at the CO 40 for amplifying the upstream signals 220$u$ received at the CO 40, due to the use of long fiber feeders 22 between the OLTs 50 and ONUs 60. More specifically, the amplifier systems 200 amplify upstream signals 220$u$ received at the CO 40 from the ONUs 60.

Referring back to FIG. 1A and FIG. 1B, in some implementations the laser system 240 may be used with the array of amplifier systems 200 (also referred to as a second optical system 270 in FIGS. 2C-2E) to amplify the upstream signals 220$u$ at the CO 40 before being received by the OLTs 50. In some examples, for TWDM-PONs 20 working at the C-Band (1530-1565 nm) or L-Band (1565-1625 nm), improved Erbium Doped Fiber Amplifiers (EDFAs) are used as the amplifier systems 200. Each EDFA includes a core of a silica fiber doped with trivalent erbium ions and is efficiently pumped with a laser at a wavelength of 980 nm or 1,480 nm, and exhibits gain in the 1,550 nm region.

One amplifier system 200 (e.g., improved EDFA) may be used to amplify multiple wavelengths inside a single fiber feeder 22. In the TWDM mode, the upstream signals 220$u$ are received at the CO 40 in burst modes (BM). The architecture of the PON causes the transmission modes for downstream transmission (OLT 50 to ONU 60) and upstream (ONU 60 to OLT 50) to be different. For the downstream transmission or downstream signals 220$d$, each OLT 50 transmits or broadcasts the downstream optical signals 220$d$ to all ONUs 60 that are optically connected with the OLT 50 in a continuous mode (CM). CM is when the downstream channel has optical data signal. However, CM cannot be used in the upstream transmission. The use of CM in the upstream transmission results in the signals transmitted from the ONUs and received by the RN 70 to be converged (with attenuation) into one fiber by the power splitter (used as the power coupler for downstream signals), and overlapping. Therefore, burst mode (BM) transmission is used for upstream transmissions. BM allows each ONU 60 to transmit a signal (i.e., an optical packet) in an allocated a time slot and the ONU 60 may only transmit within its timeslots. The phases of the BM optical packets received by the OLT 50 are different from packet to packet because the ONUs 60 are not synchronized to transmit optical packets in the same phase, and the distance between the CO 40 (the OLT 50) and each ONU 60 varies. Therefore, to compensate for the phase variation and amplitude variation in a short time, burst mode clock and data recovery (BM-CDR) and burst mode amplifier are employed respectively. In addition, the transmitter at each ONU 60 has to work in BM to be able to send the upstream signals without blocking the other ONUs 60. A BM transmitter is configured to turn on and off in a short time.

Figure 2A:
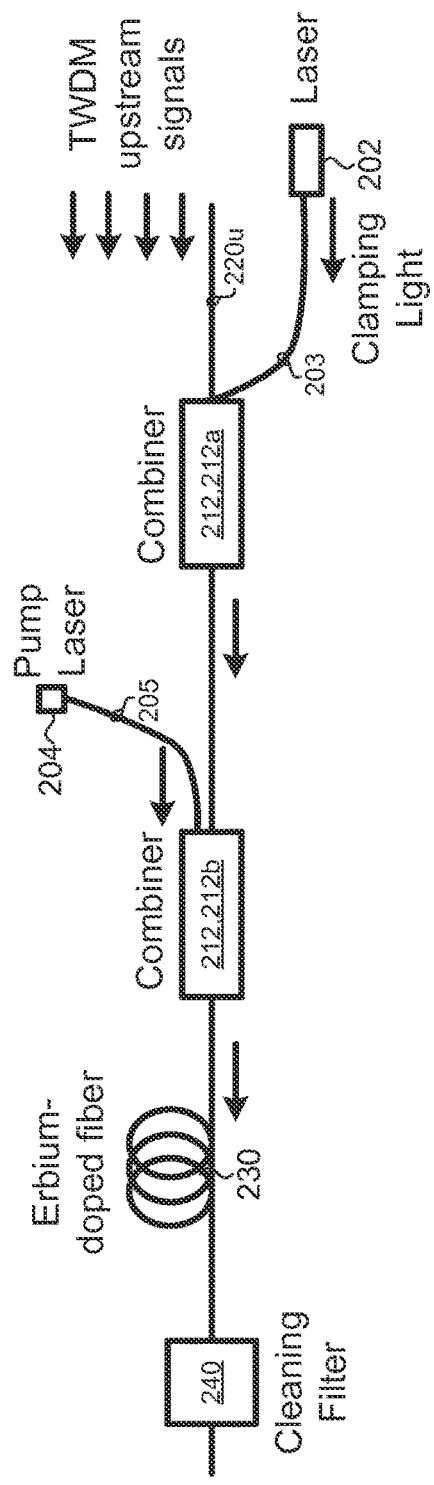
FIG. 2A is a schematic view of a prior art forwards pumped EDFA.
Figure 2B:
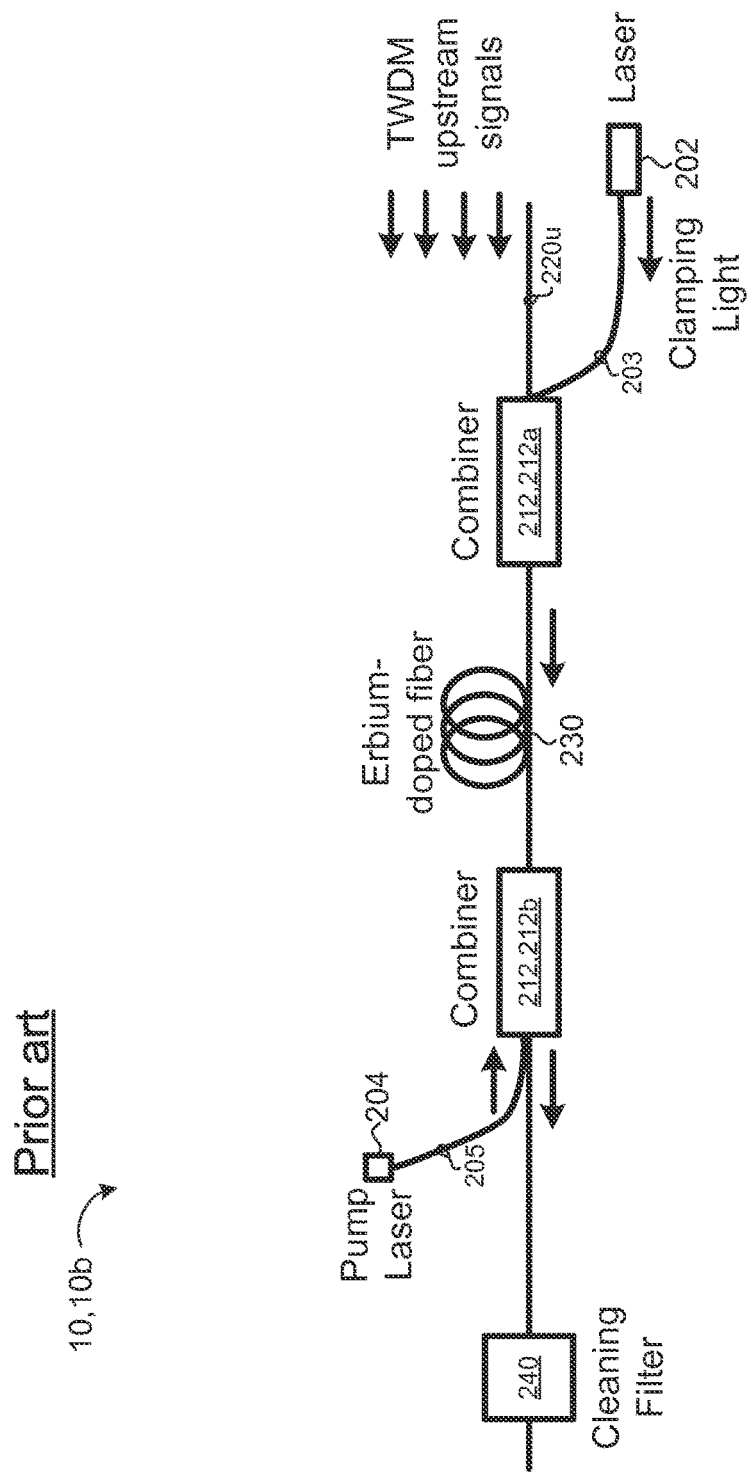
FIG. 2B is a schematic view of a prior art backward pump EDFA.

Referring to FIGS. 2A and 2B, in general, EDFAs 10, 10$a$, 10$b$ have two main components: the erbium-doped fiber (EDF) 230 and a pump laser 204. FIG. 2A shows a forward pumping EDFA 10$a$, while FIG. 2B shows a backward pumping EDFA. The forward pumping EDFA 10$a$ is configured to pump a laser signal 205 in the same direction as the upstream signal 220$u$. The backward pumping EDFA 10$b$ is configured to pump the laser signal 205 in an opposite direction of the upstream signal 220$u$. The signal amplification of the EDFAs 10 occurs as the signal travels through the EDF 230, where the pump laser 204 gives its energy to the upstream signal 220$u$, thus amplifying the upstream signal 220$u$ and reducing the power of the pump laser 204.

The erbium of the EDF 230 has a meta-stable energy state for its valence electrons. Electrons excited to higher energy states will relax to the meta-stable energy level and remain there for an extended period of time before relaxing down to the ground state, releasing a photon in the C- or L-band, if they are not 'stimulated' by other photons. This is commonly referred to as spontaneous emission. If however a photon of similar energy interacts with the excited electron, it can stimulate the electron to relax back to the ground state as the photon passes, creating a clone of the photon that is identical in frequency, phase and direction. This is commonly referred to as stimulated emission. In some instances, the ground state electrons absorb the photons, thus pushing the electron to an excited state. This is referred to as spontaneous absorption. The pump laser 204 in the EDFA 10 is responsible for exciting the valence electrons to a higher energy state via spontaneous absorption. The excited electrons then allow the signal to produce stimulated emissions, thus amplifying the signal. The total gain of the EDFA 10 is determined by various factors, such as the amount of doping, length of erbium-doped fiber and strength of the pump laser(s). Typically, EDFAs 10 can operate at a constant gain power mode by monitoring the input and output powers and adjusting the pump power of the laser pump 204 accordingly. However, the gain of the EDFA 10 used for BM signals cannot be controlled by an automatic gain control loop. The highly fluctuating input signal changes the ratio of excited to ground electrons, thus changing the gain of the amplifier 10. This typically happens at a rate faster than the pump laser 204 can be adjusted to compensate for the change. This may cause automatic gain and power control loops to produce unpredictable behavior, which is highly undesired. To avoid this, BM EDFAs may be used at a constant current mode or constant pump power mode. However, an EDFA 10 without gain clamping has a gain excursion in the first signal burst after a period with no signal. During the period of no signal, ground electrons are energized to the excited pump photons level. However, the lack of signals means that there are no stimulated emissions to balance this, thus greatly increasing the ratio of excited photons to ground electrons. The large gain excursion causes problems for the OLT receivers 50. One solution to this is to use a strong out-of-signal-band light to 'clamp' (e.g., a clamping light 202) the EDFA gain around a fixed level so the gain excursion can be greatly reduced. The clamping laser 202 limits the optical gain and the excitation density, thus stabilizes the optical gain. A clamping signal 203 is effectively a relatively high-power, out-of-band signal that is also amplified through the gain stage at the EDF 230. Therefore, it consumes some amount of excited electrons at a fixed rate even when there is no signal, thus preventing the gain of the EDFA 10 to change significantly. The relative power of the clamping signal 203 and the input signal 220$u$ are carefully chosen to control the absolute gain and gain variation of the EDFA 10. By using a clamping laser 202, the EDFAs 10 can work at constant pump power or constant current mode and still maintain a suitable gain level over life.

As previously discussed, the upstream signals 220$u$ are in BM, providing a time slot for each ONU 60 to upstream its signal 221$u$. Therefore, in some examples, a burst length associated with each signal 221$u$ of the ONU may be different than another burst length associated with another ONU 60. The burst length may be hundreds of microseconds long. The EDFA usually works at saturation region so the gain changes during a long burst causing sensitivity degradation or packet loss at OLT 50 receiver side. With continued reference to FIGS. 2A and 2B, gain clamped EDFA 10 have been previously proposed to solve this problem by injecting a strong out-of-signal band light 205 from a clamping laser 202 with TWDM optical upstream signals 220u. The clamping light 205 clamps the gain of EDF 230 to a much smaller range thus greatly reducing the signal power variation. The EDFA 10 shown includes the clamping laser 202 outputting a clamping light 203 to a first combiner 212a that combines a received upstream signal 220u from the RN 70. The first combiner 212a combines the received upstream signal 220u and the received clamping light 203 and outputs a first combined signal. Referring to FIG. 2A, describing forward pumping, the second combiner 212b receives the first combined signal and a pump light 205 from a pump laser 204 and combines the received signals into a second combined signal. The second combined signal (including the multiplexed signal 220u, the clamping signal 203, and the pump signal 205) travels through the EDF 230, where the multiplexed signal 220u and clamping signal 203 are amplified and the pump laser split signal 205 is attenuated. Referring to FIG. 2B, describing backward pumping, the EDF 230 received the first combined signal from the first combiner 212a. At the output of the EDF 230, the second combiner 212b inserts the pump laser signal 205 in to the EDF 230 in the opposite propagation direction to the first multiplexed signal 220u, thus allowing the first multiplexed signal 220u to be amplified inside the EDF 230, and forming the amplified output signal at the output of the EDF 230. Referring back to both FIGS. 2A and 2B, a cleaning filter 240 receives the amplified signal and removes the amplified clamping signal 203 and any residual pump signal 205; leaving an amplified version of the upstream signal 220u which is then outputted from the EDFA 10, 10a, 10b. The EDFAs 10, 10a, 10b shown, includes one clamping laser 202 and one pump laser 204 which are both expensive parts. Therefore, for a communication system having a CO 40 that supports multiple TWDM-PONs 20 each including an EDFA 10, the cost of the communication system would be high and not cost effective. Therefore, the proposed communication system 100 includes optical splitters (e.g., at the laser system 240) that allow sharing of the clamping laser 202 and the pump laser 204 between the multiple amplifier systems 200.

Figure 2C:
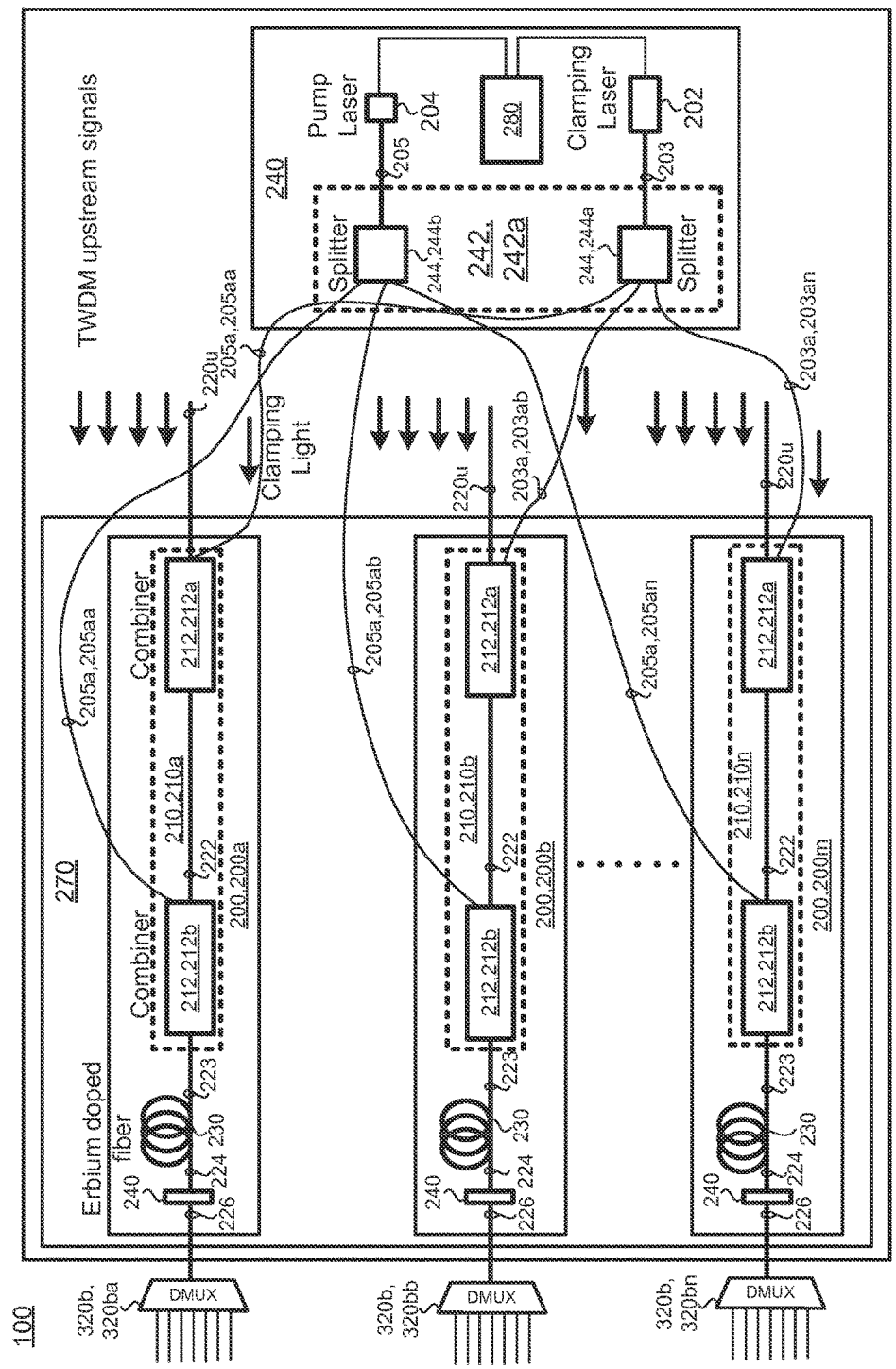
FIG. 2C is a schematic view of an example updated EDFA.
Figure 2D:
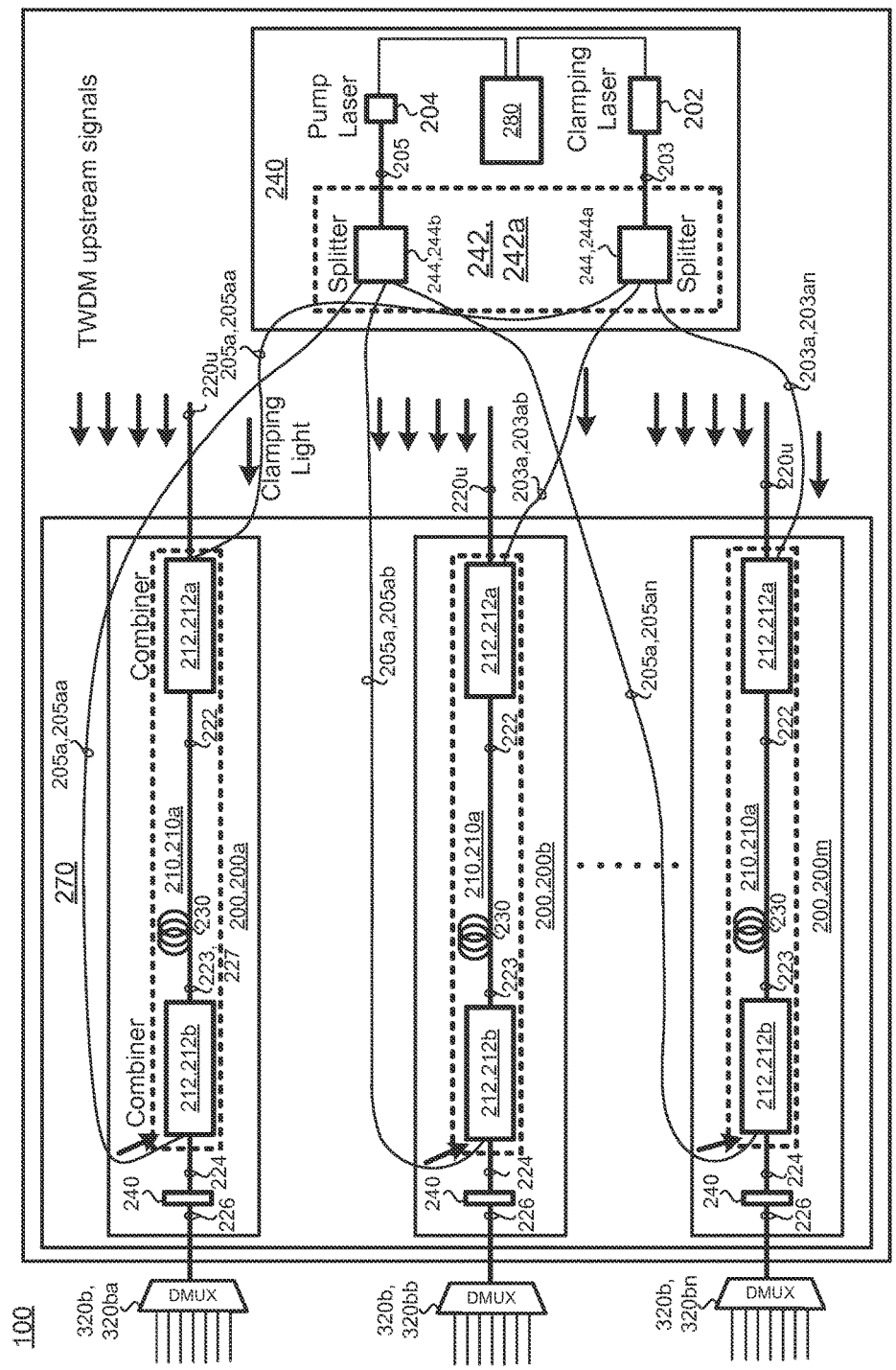
FIG. 2D is a schematic view of an example updated backward pump EDFA.
Figure 2E:
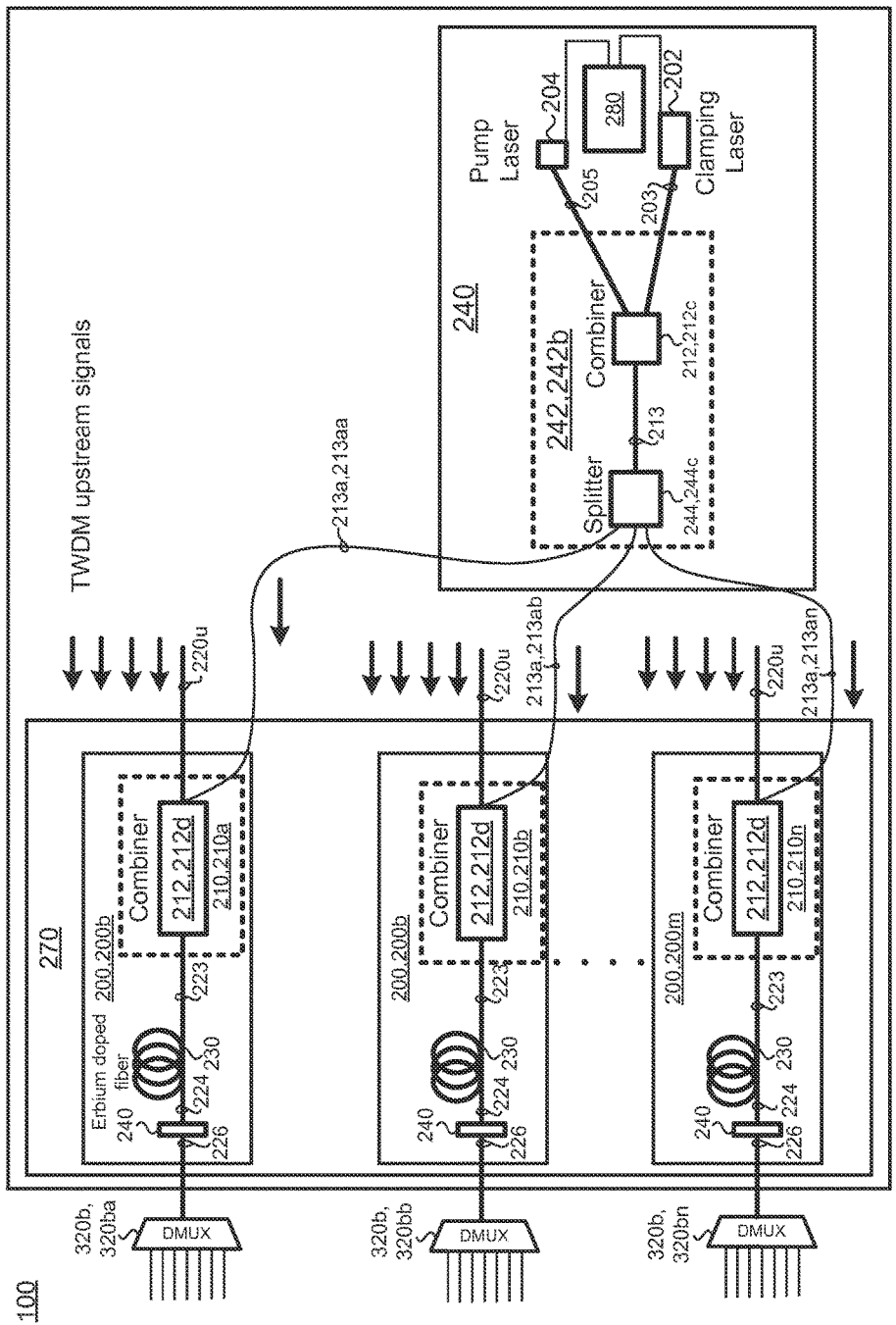
FIG. 2E is a schematic view of an example updated EDFA.

Referring to FIGS. 2C-2E, the amplifier systems 200 (i.e., improved EDFA) share a clamping laser 202 and a pump laser 204, included in the laser system 240. Sharing the laser system 240 amongst the multiple amplifier systems 200, also referred to as the second optical system 270, greatly reduces the cost of the second optical system 270. Therefore, unlike the EDFAs 10, 10a, 10b of FIGS. 2A and 2B that include the pump laser 204 and the clamping laser 202 associated with each EDF 230, the system 100 shown in FIGS. 2C-2E includes the amplifier systems 200 that share the pump laser signal 203 and the clamping laser signal 203 amongst the EDFs 230. In some examples, a CO 40 supports 20,000-30,000 users 30. A TWDM-PON 20 with 10 wavelengths and 32 time slots per TDM-PON, allows each TWDM-PON 20 to support 320 users 30. Therefore, to support the 20,000-30,000 users 30, 63-94 amplifier systems 200 are needed at the CO 40. Thus, sharing the pump laser 204 and the clamping laser among the 63-94 amplifier systems 200, instead of using one clamping laser 202 and one pump laser per amplifier system 200, greatly reduces the overall cost of the communication system 100.

FIGS. 2C-2E provide schematic views of the laser system 240 that includes a laser pump 204, a clamping laser 202, and a first optical system 242, 242a, 242b and the second optical system 270 that includes the multiple amplifier systems 200, 200a-200m. Each amplifier system 200 outputs an amplified output or upstream signal 224 optically connected to an upstream demultiplexer 320b, 320ba-320bn, that demultiplexes the outputted amplified upstream signal 224 into one or more upstream signals $S_{U1}$-$S_{Un}$ to each OLT 50. The laser system 240 is optically connected to each amplifier system 200. In some examples, each amplifier system 200 is configured to maintain a constant pump power or a constant current. The laser system 240 may include a controller 280 in communication with the pump laser 204 and the clamping laser 202. The controller 280 is configured to control the total pump power output of the pump laser signal 205 and a total clamping laser output of the clamping laser signal 203.

Referring to FIGS. 2C and 2D, the first optical system 242, 242a is optically connected to a clamping laser 202 and a pump laser 204. In addition, the first optical system 242a includes first and second optical splitters 244, 244a, 244b. The first optical splitter 244a (e.g., 1-by-M splitter) is configured to receive a clamping laser signal 203 from the clamping laser 202 and split the received clamping laser signal 203 into M split clamping laser signals 203a, 203aa-an. The second optical splitter 244b (e.g., 1-by-N splitter) is configured to receive a pump laser signal 205 from the pump laser 204 and split the received pump laser signal 205 into N split pump laser signals 205a, 205aa-205an. So the pump laser 204 and clamping laser 202 are shared by M and N amplifier systems 200 respectively, thus greatly reducing the cost of active components. M and N are integers and may or may not be equal.

Referring to FIG. 2C, the second optical system 270 is optically connected to the first optical system 242a. Moreover, the second optical system 270 includes amplifier systems 200, where each amplifier system 200 is configured to receive a multiplexed upstream signal 220u from a RN 70 associated with a TWDM-PON 20. In addition, each amplifier system 200 includes first and second combiners 212, 212a, 212b (collectively referred to as the combiner system 210, 210a-n) optically connected to an erbium-doped fiber 230. The first combiner 212a is optically connected to the first optical splitter 244a, and the second combiner 212b is optically connected to the second splitter 244b. The first combiner 212a is configured to receive the multiplexed upstream signal 220u and one of the split clamping laser signals 203a, and combine the multiplexed upstream signal 220u and the split clamping laser signal 203a into a first combined signal 222. Furthermore, the second combiner 212b is configured to receive the first combined signal 222 and one of the split pump laser signals 205a, combine the first combined signal 222 and the split pump laser signal 205a into an second combined signal 223, and output the second combined signal 223 to the EDF 230. The second combined signal 223 includes one of the split pump laser signals 205a and the first combined signal 222 (i.e., the multiplexed signal 220u and one of the split clamping laser signals 203a). The EDF 230 receives the second combined signal 223, and amplifies the multiplexed signal 220u and the split clamping laser signals 203a. In addition, the EDF 230 attenuates the split pump laser signal 205a of the second combined signal 223. The EDF 230 outputs an amplified output signal 224 into a demultiplexer optically connected to the second optical system 270. The amplified output signal 224 includes the amplified second combined signal 223 and the attenuated split pump laser signal 205a. More specifically, each amplifier system 200 is connected to a respective demultiplexer 320b. In some implementations, the amplifier system 200 includes a cleaning filter 240 that receives and filters the amplified output signal 224 into a filtered amplified signal 226, containing only the amplified multiplexed signal and removing the amplified clamping signal 203a and any attenuated pump signal 205a, before outputting it to the respective demultiplexer 320b.

FIG. 2C describes a forward pumping amplifier system 200 where the direction of the laser signal 205 is the same as the multiplexed signal 220u. However, FIG. 2D describes a backward pumping amplifier system 200 where the pump laser signal 205 propagates in the opposite direction of the multiplexed signal 220u. In this case, each amplifier system 200 includes first and second combiners 212, 212a, 112b optically connected to an erbium-doped fiber 230 positioned between the first and second combiners 212a, 212b. The first combiner 212a is optically connected to the first optical splitter 244a, and the second combiner 212b is optically connected to the second splitter 244b. The first combiner 212a is configured to receive the multiplexed upstream signal 220u and one of the split clamping laser signals 203a, and combine the multiplexed upstream signal 220u and the split clamping laser signal 203a into a first combined signal 222.

The EDF 230 receives the first combined signal 222, and amplifies the first combined signal 222 into an amplified first combined signal 223. The split clamping laser signal 203a and the multiplexed signal 220u of the first combined signal 222 propagate in the same direction. An input/output of the second combiner 212b is connected to an output of the EDF 230. The second combiner 212b is configured to receive a split pump laser signal 205a and insert it into the EDF 230, where the split pump laser signal 205a is propagating in an opposite direction of the first combined signal 222. In other words, the second combiner 212b receives the pump laser signal 205a and the amplified first combined signal 223, and combines both signals into an intermediate amplified signal 227 that includes a bi-directional signal, being the amplified first combined signal 223 and the split pump laser signal 205a. Therefore, the first combined signal 222 is amplified inside the EDF 230 using the power of the split pump laser signal 205a, producing an amplified output signal 224 outputted from the second combiner 224. In addition, the second combiner 212b is configured to output to a demultiplexer 320b optically connected to the second optical system 270 an amplified output signal 224 being the amplified first combined signal 223, i.e., the intermediate amplified signal 227 without the split pump laser signal 205a. Each amplifier system 200 may be connected to a respective demultiplexer 320b. In some implementations, the amplifier system 200 includes a cleaning filter 240 that receives then filters the amplified output signal 224 into a filtered amplified signal 226 before outputting it to the respective demultiplexer 320b. The filtered amplified signal 226, containing only the amplified multiplexed signal and removing the amplified clamping signal 203a. Additionally or alternatively, in some examples a different cleaning filter (not shown) may be positioned at the output of the erbium-doped fiber to remove any residual pump signal from the intermediate amplified signal.

FIG. 2E shows another method for sharing the clamping laser 202 and the pump laser 204 amongst the amplifier systems 200. In this case, the clamping signal 203 and the pump signal 205 are combined at the laser system 240, and the combiner system 210 includes one combiner 212, 212d. The first optical system 242, 242b includes a first combiner 212c and a splitter 244, 244c. The first combiner 212c is configured to receive the pump laser signal 205 from the pump laser 204 and the clamping laser signal 203 from the clamping laser 202, and combine the received pump laser signal 205 and the received clamping laser signal 203 into a first combined signal 213. The splitter 244c is configured to split the first combined signal 213 into split signals 213a, 213aa-213an. The second optical system 270 is optically connected to the first optical system 242b. The second optical system 270 includes the amplifier systems 200. Each amplifier system 200 is configured to receive the multiplexed upstream signal 220u. In addition, each amplifier system 200 includes a second combiner 212d and an erbium-doped fiber 230 having an input end and an output end. The second combiner 212d is optically connected to the input end. The second combiner 212d is configured to receive the upstream multiplexed signal 220u and one of the split signals 213a, 213aa-213an, and combine the upstream multiplexed signal 220u and the one of the split signals 213a, 213aa-213an into a second combined signal 223. The second combined signal 223 goes through the EDF 230, which amplifies the multiplexed signal 220u and the clamping signal 203 of the split signals 213a, while attenuating the pump signal 205 of the split signals 213a. This produces an amplified output signal 224. The amplifier system 200 outputs the amplified output signal 224 to a demultiplexer optically connected to the amplifier system 200 from the output end of the erbium-doped fiber 230 of the respective amplifier system 200. In some examples, the amplifier system 200 includes a cleaning filter 240 that receives then filters the amplified output signal 224 into a filtered amplified signal 226, comprising only of the amplified multiplexed signal 220u and removing the amplified clamping signal 203 and any residual pump signal 205, before outputting it to the respective demultiplexer 320b.

Figure 3:
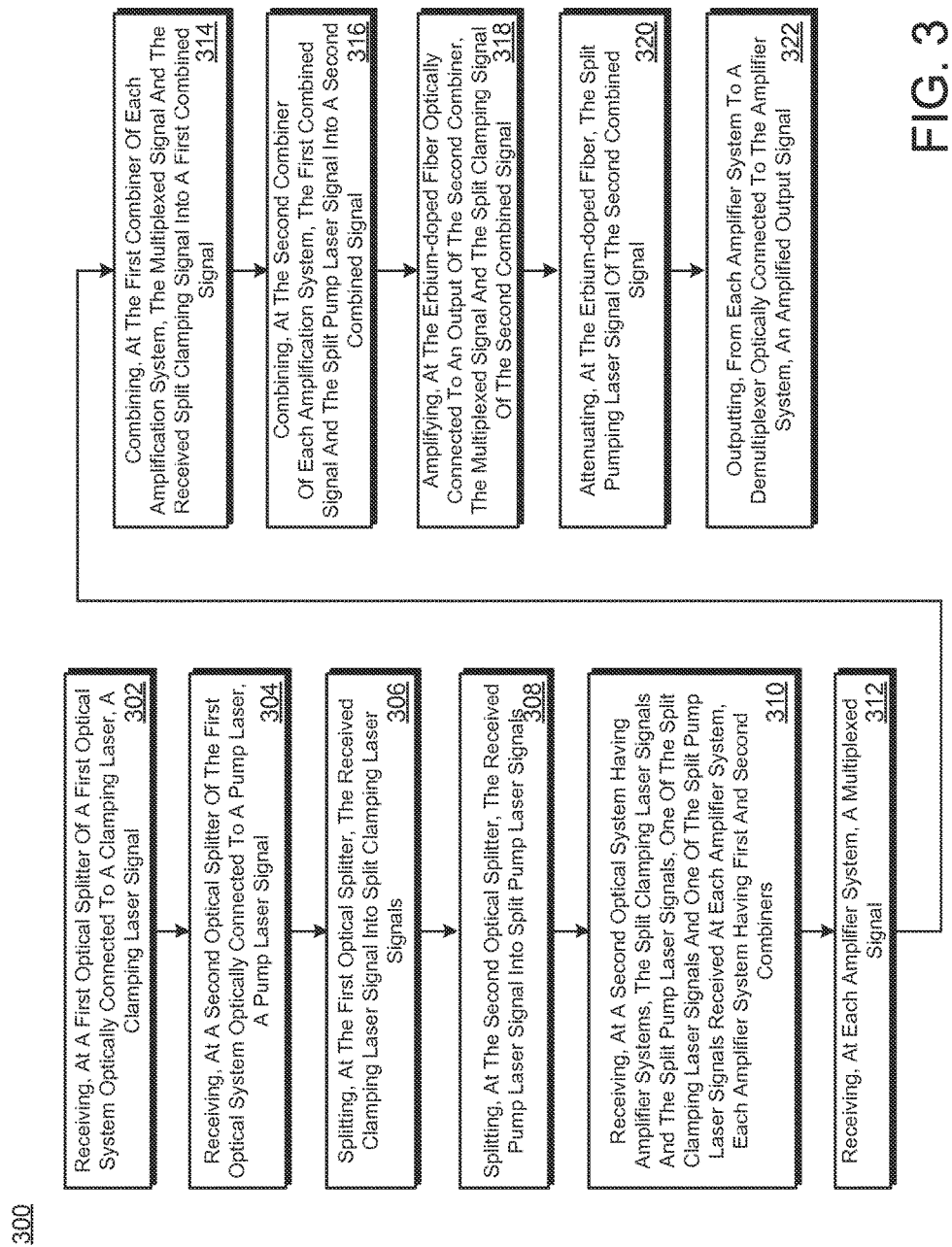
FIG. 3 is an example arrangement of operations for a method of amplifying an upstream signal using the system of FIG. 2C.

FIG. 3 is an example arrangement of operations for a method 300 of amplifying an upstream signal 220 using the system described in FIG. 2C. At block 302, the method 300 includes receiving, at a first optical splitter 244a of a first optical system 242a optically connected to a clamping laser 202, a clamping laser signal 203. At block 304, the method 300 includes receiving, at a second optical splitter 244b of the first optical system 242a optically connected to a pump laser 204, a pump laser signal 205. At block 306, the method includes splitting, at the first optical splitter 244a, the received clamping laser signal 203 into split clamping laser signals 203a. At block 308, the method 300 includes splitting, at the second optical splitter 244b, the received pump laser signal 205 into split pump laser signals 205a. Additionally, at block 310, the method 300 includes receiving, at the second optical system 270 having amplifier systems 200, the split clamping laser signals 203a and the split pump laser signals 205a. Each amplifier system 200 receives one of the split clamping laser signals 203a and one of the split pump laser signals 205a. Each amplifier system 200 has first and second combiners 212, 212b, (i.e., the combiner system 210). At block 312, the method 300 also includes receiving, at each amplifier system 200, an upstream multiplexed signal 220u. At block 314, the method 300 includes combining, at the first combiner 212a of each amplifier system 200, the upstream multiplexed signal 220u and the received split clamping signal 203a into a first combined signal 222. At block 316, the method 300 includes combining, at the second combiner 212b of each amplifier system 200, the first combined signal 222 and the split laser signal 205a into a second combined signal 223. At block 318, the method 300 includes amplifying, at the erbium-doped fiber that is optically connected to an output of the second combiner 212b, the multiplexed signal and the split clamping signal 203a of the second combined signal 223. The method 300 includes at block 320, attenuating at the EDF 230, the split pump laser signal 205a of the second combined signal 223, and at block 322 outputting, from each amplifier system 200 to a demultiplexer 320b optically connected to the amplifier system 200, an amplified output signal 224. The amplified output signal 224 including the amplified multiplexed signal, the amplified split clamping laser signal and the attenuated split clamping laser signal.

Figure 4:
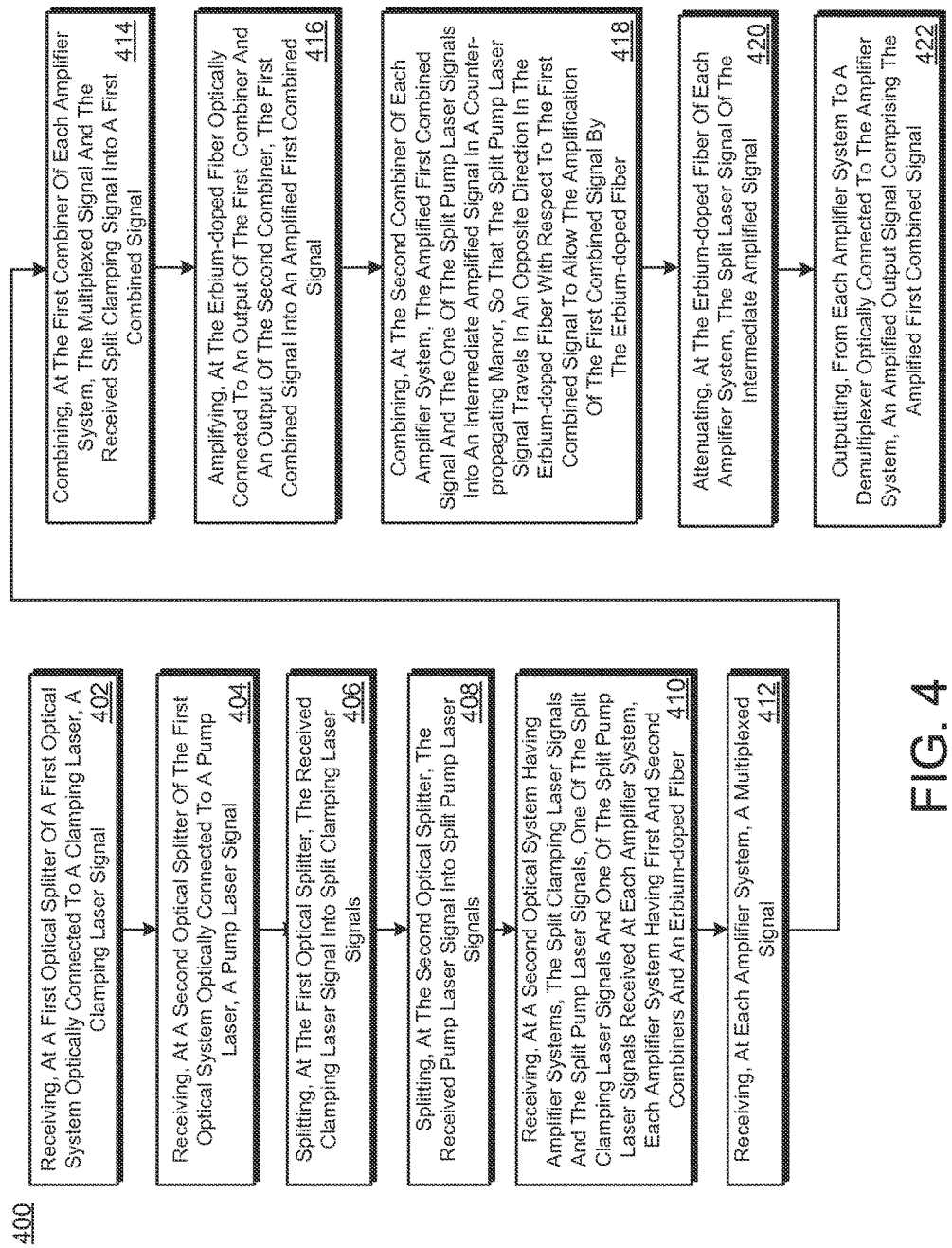
FIG. 4 is an example arrangement of operations for a method of amplifying an upstream signal using the system of FIG. 2D.

FIG. 4 is a second example arrangement of operations for a method 400 of amplifying an upstream signal 220 using the system described in FIG. 2D. At block 402, the method 400 includes receiving, at a first optical splitter 244a of a first optical system 242a optically connected to a clamping laser 202, a clamping laser signal 203. At block 404, the method 400 includes receiving, at a second optical splitter 244b of the first optical system 242a optically connected to a pump laser 204, a pump laser signal 205. At block 406, the method includes splitting, at the first optical splitter 244a, the received clamping laser signal 203 into split clamping laser signals 203a. At block 408, the method 400 includes splitting, at the second optical splitter 244b, the received pump laser signal 205 into split pump laser signals 205a. Additionally, at block 410, the method 400 includes receiving, at the second optical system 270 having amplifier systems 200, the split clamping laser signals 203a and the split pump laser signals 205a. Each amplifier system 200 receives one of the split clamping laser signals 203a and one of the split pump laser signals 205a. Each amplifier system 200 has first and second combiners 212, 212b and an erbium-doped fiber 230. At block 412, the method 400 also includes receiving, at each amplifier system 200, an upstream multiplexed signal 220u. At block 414, the method 400 includes combining, at the first combiner 212a of each amplifier system 200, the upstream multiplexed signal 220u and the received split clamping signal 203a into a first combined signal 222. At block 416, the method 400 includes amplifying, at the erbium-doped fiber 230 that is optically connected to an output of the first combiner and an output of the second combiner, the first combined signal into an amplified first combined signal 223. At block 418, the method 400 includes combining, at the second combiner 212b of each amplifier system 200, the amplified first combined signal 223 and the one of the split pump laser signals 205a into an intermediate amplified signal 227 in a counter-propagating manor. This allows the split pump laser signal 205a to travel in an opposite direction in the EDF 230 with respect to the first combined signal 222 to allow the amplification of the first combined signal 222 by the EDF 230. At lock 420, the method 400 includes attenuating, at the EDB 230 of each amplifier system 200, the split laser signal 205a of the intermediate amplified signal 227. At block 422, the method 400 also includes outputting, from each amplifier system 200 to a demultiplexer 320b optically connected to the amplifier system 200, an amplified output signal 224 that includes the amplified first combined signal 223. Additionally or alternatively, in some examples a different cleaning filter may be present at the output of the erbium-doped fiber to remove any residual pump signal from the intermediate amplified signal.

Figure 5:
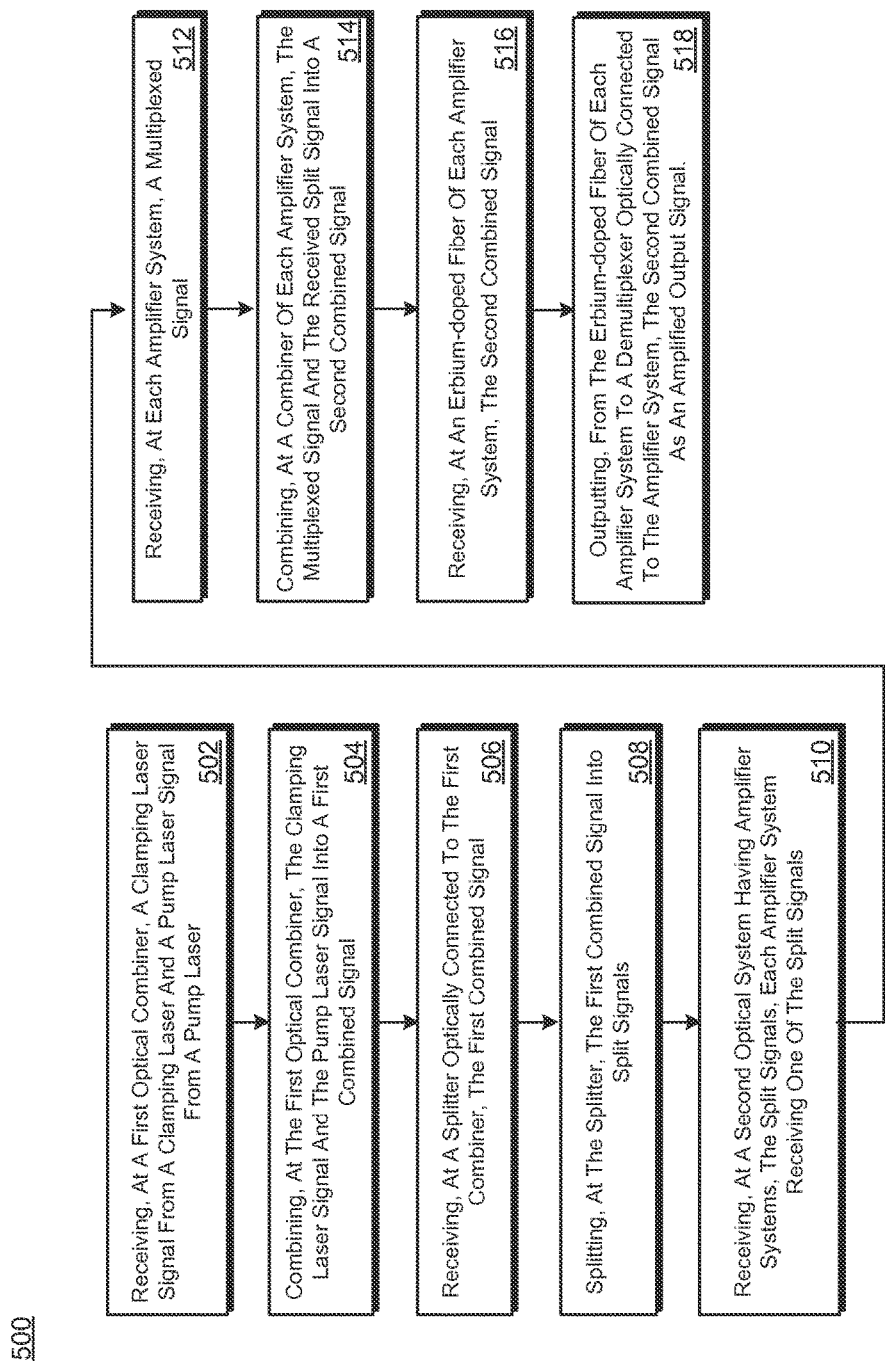
FIG. 5 is an example arrangement of operations for a method of amplifying an upstream signal using the system of FIG. 2E.

FIG. 5 is a third example arrangement of operations for a method 500 of amplifying an upstream signal using the system described in FIG. 2E. At block 502, the method 500 includes receiving, at a first optical combiner 212c, a clamping laser signal 203 from a clamping laser 202 and a pump laser signal 205 from a pump laser 204. At block 504, the method 500 includes combining, at the first optical combiner 212c, the clamping laser signal 203 and the pump laser signal 205 into a first combined signal 213 and, at block 506, receiving, at a splitter 244c optically connected to the first combiner 212c, the first combined signal 213. At block 508, the method 500 also includes splitting, at the splitter 244c, the first combined signal 213 into split signals 213a, 213aa-213an. At block 510, the method 500 includes receiving, at a second optical system 270 having amplifier systems 200, the split signals 213a, 213aa-213an. Each amplifier system 200 receives one of the split signals 213a, 213aa-213an. At block 512, the method 500 includes receiving, at each amplifier system 200, a multiplexed upstream signal 220u. At block 514, the method 500 also includes combining, at a combiner 212d of each amplifier system 200, the multiplexed signal 220u and the received split signal 213a, 213aa-213an into a second combined signal 223. At block 516, the method 500 includes receiving, at an EDF 230 of each amplifier system 200, the second combined signal 230. At block 518, the method 500 includes outputting from the EDB 230 of each amplifier system 200 to a demultiplexer 320b optically connected to the amplifier system 200, the second combined signal 223 as an amplified output signal 224. Alternatively, in some examples, at block 516 the method 500 includes amplifying, at the EDB 230 that is optically connected to an output of the second combiner 212b, the multiplexed signal 220u and the split clamping signal 203a of the second combined signal 223. Also (alternatively) at block 518 the method 500 includes, attenuating at the EDF 230, the split pump laser signal 205a of the second combined signal 223, and outputting, from each amplifier system 200 to a demultiplexer 320b optically connected to the amplifier system 200, an amplified output signal 224. The amplified output signal 224 including the amplified multiplexed signal, the amplified split clamping laser signal and the attenuated split clamping laser signal.

Referring to FIGS. 3-5, in some implementations each amplifier system 200 is configured to maintain a constant pump power or a constant current. The methods 300, 400, 500 may further include controlling, using a controller in communication with the pump laser 204 and the clamping laser 202, a total pump power output and a total clamping laser output. In some examples, the methods 300, 400, 500 further include receiving, at the upstream demultiplexer 320b, the amplified output signal 224, demultiplexing, at the upstream demultiplexer 320b, the amplified output signal 224 into to one or more demultiplexed output signals $S_{U1}$-$S_{Un}$, and outputting, from the demultiplexer 320b, one demultiplexed output signal $S_{U1}$-$S_{Un}$ to each OLT 50 optically connected with the upstream demultiplexer 320b. The multiplexed signal 220u may include upstream signals, where each upstream signal is received from an optical network unit ONU. In addition, in some examples, the methods 300, 400, 500 may include filtering, at a cleaning filter 240 the amplified output signal 224 (into a filtered amplified signal 226) before outputting the amplified output signal 224 to the upstream demultiplexer 320b. The filtered amplified signal 226 including an amplified multiplexed signal 220u and removing any amplified clamping signal 203a and/or any residual pump laser signal 205a.

FIG. 6 is schematic view of an example controller 280 or computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM).

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication system comprising:
a first optical system optically connected to a clamping laser and a pump laser, the first optical system comprising first and second optical splitters, the first optical splitter configured to receive a clamping laser signal from the clamping laser and split the received clamping laser signal into split clamping laser signals, the second optical splitter configured to receive a pump laser signal from the pump laser and split the received pump laser signal into split pump laser signals; and
a second optical system optically connected to the first optical system, the second optical system comprising amplifier systems, each amplifier system configured to receive a multiplexed signal and comprising first and second combiners optically connected to an erbium-doped fiber, the first combiner optically connected to the first splitter, the second combiner optically connected to the second splitter, wherein the first combiner is configured to:
  receive the multiplexed signal and one of the split clamping laser signals; and
  combine the multiplexed signal and the one of the split clamping laser signals into a first combined signal,
wherein the second combiner is configured to:
  receive the first combined signal and one of the split pump laser signals; and
  combine the first combined signal and the one of the split pump laser signals into a second combined signal; and wherein the erbium-doped fiber is configured to:
  receive the second combined signal;
  amplify the multiplexed signal and the split clamping laser signal of the second combined signal;
  attenuate the split pump laser signal of the second combined signal; and
  output an amplified output signal from the second optical system, the amplified output signal comprising the amplified multiplexed signal, the amplified split clamping laser signal and the attenuated split pump laser signal.

2. The communication system of claim 1, wherein each amplifier system is configured to maintain a constant pump power or a constant current.

3. The communication system of claim 1, further comprising a controller in communication with the pump laser and the clamping laser, the controller configured to control a total pump power output and a total clamping laser output.

4. The communication system of claim 1, further comprising the demultiplexer configured to:
receive the amplified output signal;
demultiplex the amplified output signal into demultiplexed optical signals; and
output each demultiplexed optical signal to an optical line terminal in optical communication with the demultiplexer.

5. The communication system of claim 1, wherein the multiplexed signal comprises upstream signals, each upstream signal received from an optical network unit.

6. A method comprising:
receiving, at a first optical splitter of a first optical system optically connected to a clamping laser, a clamping laser signal;
receiving, at a second optical splitter of the first optical system optically connected to a pump laser, a pump laser signal;
splitting, at the first optical splitter, the received clamping laser signal into split clamping laser signals;
splitting, at the second optical splitter, the received pump laser signal into split pump laser signals;
receiving, at a second optical system having amplifier systems, the split clamping laser signals and the split pump laser signals, one of the split clamping laser signals and one of the split pump laser signals received at each amplifier system, each amplifier system having first and second combiners and an erbium-doped fiber;
receiving, at each amplifier system, a corresponding multiplexed signal;
combining, at the first combiner of each amplifier system, the corresponding multiplexed signal and the received split clamping signal into a first combined signal;
combining, at the second combiner of each amplifier system, the first combined signal and the split pump laser signal into a second combined signal;
amplifying, at the erbium-doped fiber optically connected to an output of the second combiner of each amplifier system, the corresponding multiplexed signal and the split clamping signal of the second combined signal;
attenuating, at the erbium-doped fiber of each amplifier system, the split pump laser signal of the second combined signal; and
outputting, from each amplifier system to a demultiplexer optically connected to the corresponding amplifier system, an amplified output signal, the amplified output signal comprising the amplified multiplexed signal, the amplified split clamping laser signal and the attenuated split pump laser signal.

7. The method of claim 6, wherein each amplifier system is configured to maintain a constant pump power or a constant current.

8. The method of claim 6, further comprising controlling, using a controller in communication with the pump laser and the clamping laser to control a total pump power output and a total clamping laser output.

9. The method of claim 6, further comprising:
receiving, at the demultiplexer, the amplified output signal;
demultiplexing, at the demultiplexer, the amplified output signal into demultiplexed optical signals; and
outputting, from the demultiplexer, each demultiplexed optical signal to an optical line terminal in optical communication with the demultiplexer.

10. The method of claim 6, wherein each multiplexed signal comprises upstream signals, each upstream signal received from an optical network unit.

11. A communication system comprising:
a first optical system optically connected to a pump laser and a clamping laser, the first optical system comprising:
  a first combiner configured to:
    receive a pump laser signal from the pump laser,
    receive a clamping laser signal from the clamping laser,
    combine the received pump laser signal and the received clamping laser signal into a first combined signal; and
  a splitter configured to split the first combined signal into split signals; and
a second optical system optically connected to the first optical system, the second optical system comprising amplifier systems, each amplifier system configured to receive a corresponding multiplexed signal, each amplifier system comprising a second combiner and an erbium-doped fiber having an input end and an output end, the second combiner optically connected to the input end of the erbium-doped fiber, the second combiner configured to:
receive the corresponding multiplexed signal;
receive one of the split signals; and
combine the corresponding multiplexed signal and the one of the split signals into a second combined signal, and
wherein the erbium-doped fiber is configured to:
receive the second combined signal; and
output the second combined signal as an amplified output signal, from the output end of the erbium-doped fiber.

12. The communication system of claim 11, wherein each amplifier system is configured to maintain a constant pump power or a constant current.

13. The communication system of claim 11, further comprising a controller in communication with the pump laser and the clamping laser, the controller configured to control a total pump power output and a total clamping laser output.

14. The communication system of claim 11, further comprising a demultiplexer configured to:
receive the amplified output signal;
demultiplex the amplified output signal into demultiplexed optical signals; and
output each demultiplexed optical signal to an optical line terminal in optical communication with the demultiplexer.

15. The communication system of claim 11, wherein each multiplexed signal comprises upstream signals, each upstream signal received from an optical network unit.

16. A method comprising:
receiving, at a first optical combiner, a clamping laser signal from a clamping laser and a pump laser signal from a pump laser;
combining, at the first optical combiner, the clamping laser signal and the pump laser signal into a first combined signal;
receiving, at a splitter optically connected to the first combiner, the first combined signal;
splitting, at the splitter, the first combined signal into split signals;
receiving, at a second optical system having amplifier systems, the split signals, each amplifier system receiving one of the split signals;
receiving, at each amplifier system, a corresponding multiplexed signal;
combining, at a combiner of each amplifier system, the corresponding multiplexed signal and the received split signal into a second combined signal;
receiving, at an erbium-doped fiber of each amplifier system, the corresponding second combined signal; and
outputting, from the erbium-doped fiber of each amplifier system to a demultiplexer optically connected to the amplifier system, the second combined signal as an amplified output signal.

17. The method claim 16, wherein each amplifier system is configured to maintain a constant pump power or a constant current.

18. The method claim 16, further comprising controlling, using a controller in communication with the pump laser and the clamping laser, a total pump power output and a total clamping laser output.

19. The method claim 16, further comprising:
receiving, at the demultiplexer, the amplified output signal;
demultiplexing, at the demultiplexer, the amplified output signal into demultiplexed optical signals; and
outputting, from the demultiplexer, each demultiplexed optical signal to an optical line terminal in optical communication with the demultiplexer.

20. The method claim 16, wherein each multiplexed signal comprises upstream signals, each upstream signal received from an optical network unit.

21. A communication system comprising:
a first optical system optically connected to a clamping laser and a pump laser, the first optical system comprising first and second optical splitters, the first optical splitter configured to receive a clamping laser signal from the clamping laser and split the received clamping laser signal into split clamping laser signals, the second optical splitter configured to receive a pump laser signal from the pump laser and split the received pump laser signal into split pump laser signals; and
a second optical system optically connected to the first optical system, the second optical system comprising amplifier systems, each amplifier system comprising:
first and second combiners; and
an erbium-doped fiber having an input end optically connected to the first combiner and an output end optically connected to the second combiner, the first combiner optically connected to the first splitter, the second combiner optically connected to the second splitter, wherein the first combiner is configured to:
receive a multiplexed signal and one of the split clamping laser signals; and
combine the multiplexed signal and the one of the split clamping laser signals into a first combined signal,
wherein the erbium-doped fiber is configured to:
receive the first combined signal; and
amplify the first combined signal into an amplified first combined signal; and
wherein the second combiner is configured to:
receive the amplified first combined signal and one of the split pump laser signals;
combine the amplified first combined signal and the one of the split pump laser signals into an intermediate amplified signal in a counter-propagating manor, so that the split pump laser signal travels in an opposite direction in the erbium-doped fiber with respect to the first combined signal to allow the amplification of the first combined signal by the erbium-doped fiber; and
output an amplified output signal from the second optical system, the amplified output signal comprising the amplified first combined signal.

22. The communication system of claim 21, wherein each amplifier system is configured to maintain a constant pump power or a constant current.

23. The communication system of claim 21, further comprising a controller in communication with the pump laser and the clamping laser, the controller configured to control a total pump power output and a total clamping laser output.

24. The communication system of claim 21, further comprising a demultiplexer configured to:
receive the amplified output signal;
demultiplex the amplified output signal into demultiplexed optical signals; and
output each demultiplexed optical signal.

25. The communication system of claim 21, wherein the multiplexed signal comprises upstream signals, each upstream signal received from an optical network unit.

26. A method comprising:
receiving, at a first optical splitter of a first optical system optically connected to a clamping laser, a clamping laser signal;
receiving, at a second optical splitter of the first optical system optically connected to a pump laser, a pump laser signal;
splitting, at the first optical splitter, the received clamping laser signal into split clamping laser signals;
splitting, at the second optical splitter, the received pump laser signal into split pump laser signals;
receiving, at a second optical system having amplifier systems, the split clamping laser signals and the split pump laser signals, one of the split clamping laser signals and one of the split pump laser signals received at each amplifier system, each amplifier system having first and second combiners and an erbium-doped fiber;
receiving, at each amplifier system, a multiplexed signal;
combining, at the first combiner of each amplifier system, the multiplexed signal and the received split clamping signal into a first combined signal;
amplifying, at the erbium-doped fiber optically connected to an output of the first combiner and an output of the second combiner, the first combined signal into an amplified first combined signal;
combining, at the second combiner of each amplifier system, the amplified first combined signal and the one of the split pump laser signals into an intermediate amplified signal in a counter-propagating manor, so that the split pump laser signal travels in an opposite direction in the erbium-doped fiber with respect to the first combined signal to allow the amplification of the first combined signal by the erbium-doped fiber;
attenuating, at the erbium-doped fiber of each amplifier system, the split laser signal of the intermediate amplified signal; and
outputting, from each amplifier system to a demultiplexer optically connected to the amplifier system, an amplified output signal comprising the amplified first combined signal.

27. The method of claim 26, wherein each amplifier system is configured to maintain a constant pump power or a constant current.

28. The method of claim 26, further comprising controlling, using a controller in communication with the pump laser and the clamping laser, a total pump power output and a total clamping laser output.

29. The method of claim 26, further comprising:
receiving, at the demultiplexer, the amplified output signal;
demultiplexing, at the demultiplexer, the amplified output signal into demultiplexed optical signals; and
outputting, from the demultiplexer, each demultiplexed optical signal to an optical line terminal in optical communication with the demultiplexer.

30. The method of claim 26, wherein the multiplexed signal comprises upstream signals, each upstream signal received from an optical network unit.

* * * * *